(12) United States Patent  
Meir et al.

(10) Patent No.: US 7,929,816 B2
(45) Date of Patent: Apr. 19, 2011

(54) WAVEGUIDE SHEET CONTAINING IN-COUPLING, PROPAGATION, AND OUT-COUPLING REGIONS

(75) Inventors: Noam Meir, Hezlia (IL); Eran Fine, Tel-Aviv (IL)

(73) Assignee: Oree, Inc., Ramat Gan (IL)

( * ) Notice: Subject to any disclaimer, the term of this patent is extended or adjusted under 35 U.S.C. 154(b) by 0 days.

(21) Appl. No.: 12/324,535

(22) Filed: Nov. 26, 2008

(65) Prior Publication Data

US 2009/0161383 A1 Jun. 25, 2009

Related U.S. Application Data

(60) Provisional application No. 61/006,110, filed on Dec. 19, 2007, provisional application No. 61/064,384, filed on Mar. 3, 2008, provisional application No. 61/127,095, filed on May 9, 2008, provisional application No. 61/135,098, filed on Jul. 16, 2008.

(51) Int. Cl.
*G02B 6/26* (2006.01)

(52) U.S. Cl. .......................................... 385/39; 385/129

(58) Field of Classification Search .................. None
See application file for complete search history.

(56) References Cited

U.S. PATENT DOCUMENTS

| | | | |
|---|---|---|---|
| 3,261,356 A | 7/1966 | Wallace | |
| 3,626,471 A | 12/1971 | Florin | |
| 3,871,747 A | 3/1975 | Andrews | |
| 3,995,934 A | 12/1976 | Nath et al. | |
| 4,551,129 A | 11/1985 | Coleman et al. | |
| 4,669,467 A | 6/1987 | Willett et al. | |
| 4,762,381 A | 8/1988 | Uemiya et al. | |
| 4,783,140 A | 11/1988 | Osawa et al. | |
| 4,829,192 A | 5/1989 | Kokubu et al. | |
| 4,853,593 A | 8/1989 | Stein et al. | |
| 4,872,837 A | 10/1989 | Issalene et al. | |
| 4,878,072 A | 10/1989 | Reinten | |
| 4,906,062 A | 3/1990 | Young et al. | |
| 5,048,913 A | 9/1991 | Glenn et al. | |
| 5,061,032 A | 10/1991 | Meltz et al. | |
| 5,139,420 A | 8/1992 | Walker | |
| 5,152,686 A | 10/1992 | Duggan et al. | |
| 5,165,187 A | 11/1992 | Shahidi-Hamedani et al. | |
| 5,281,134 A | 1/1994 | Schultz | |
| 5,425,730 A | 6/1995 | Luloh | |
| 5,535,105 A | 7/1996 | Koenen et al. | |
| 5,559,358 A | 9/1996 | Burns et al. | |
| 5,569,254 A | 10/1996 | Carlson et al. | |

(Continued)

FOREIGN PATENT DOCUMENTS

DE 1 995 2430 5/2001

(Continued)

OTHER PUBLICATIONS

International Search Report and Written Opinion for PCT/IL2008/01554, dated May 19, 2009.
ISR and WO for PCT/IL2009/000248, mailed Dec. 14, 2009 (25 pages).

(Continued)

*Primary Examiner* — Sung H Pak
(74) *Attorney, Agent, or Firm* — Bingham McCutchen LLP

(57) ABSTRACT

In one aspect, an illumination structure includes a substantially non-fiber waveguide, which itself includes a discrete in-coupling region for receiving light, a discrete propagation region for propagating light, and a discrete out-coupling region for emitting light.

25 Claims, 20 Drawing Sheets

U.S. PATENT DOCUMENTS

| | | |
|---|---|---|
| 5,580,154 A | 12/1996 | Coulter et al. |
| 5,675,678 A | 10/1997 | Neuberger et al. |
| 5,718,666 A | 2/1998 | Alarcon |
| 5,813,752 A | 9/1998 | Singer et al. |
| 5,813,753 A | 9/1998 | Vriens et al. |
| 5,847,507 A | 12/1998 | Butterworth et al. |
| 5,899,552 A | 5/1999 | Yokoyama et al. |
| 5,959,316 A | 9/1999 | Lowery |
| 5,969,869 A | 10/1999 | Hirai et al. |
| 6,031,511 A | 2/2000 | DeLuca et al. |
| 6,079,838 A | 6/2000 | Parker et al. |
| 6,097,871 A | 8/2000 | De Dobbelaere et al. |
| 6,155,699 A | 12/2000 | Miller et al. |
| 6,226,440 B1 | 5/2001 | Lyons |
| 6,275,512 B1 | 8/2001 | Fermann |
| 6,278,106 B1 | 8/2001 | Muto et al. |
| 6,322,225 B1 | 11/2001 | Koike et al. |
| 6,329,444 B1 | 12/2001 | McGlothlin et al. |
| 6,351,069 B1 | 2/2002 | Lowery et al. |
| 6,356,691 B2 | 3/2002 | Seong-jin et al. |
| 6,408,123 B1 | 6/2002 | Kuroda et al. |
| 6,473,554 B1 | 10/2002 | Pelka et al. |
| 6,488,704 B1 | 12/2002 | Connelly et al. |
| 6,491,443 B1 | 12/2002 | Serizawa et al. |
| 6,501,100 B1 | 12/2002 | Srivastava et al. |
| 6,501,102 B2 | 12/2002 | Mueller-Mach et al. |
| 6,522,065 B1 | 2/2003 | Srivastava et al. |
| 6,528,755 B2 | 3/2003 | Grewell et al. |
| 6,530,670 B2 | 3/2003 | Hirayama et al. |
| 6,549,709 B1 | 4/2003 | De Dobbelaere et al. |
| 6,551,346 B2 | 4/2003 | Crossley |
| 6,554,462 B2 | 4/2003 | Hulse et al. |
| 6,608,332 B2 | 8/2003 | Shimizu et al. |
| 6,614,179 B1 | 9/2003 | Shimizu et al. |
| 6,621,211 B1 | 9/2003 | Srivastava et al. |
| 6,635,363 B1 | 10/2003 | Duclos et al. |
| 6,635,987 B1 | 10/2003 | Wojnarowski et al. |
| 6,637,924 B2 | 10/2003 | Pelka et al. |
| 6,654,532 B1 * | 11/2003 | Tomaru et al. ............. 385/129 |
| 6,671,235 B1 | 12/2003 | Hawryluk et al. |
| 6,680,004 B2 | 1/2004 | Ono et al. |
| 6,687,010 B1 | 2/2004 | Horii et al. |
| 6,694,069 B2 | 2/2004 | Kaneko et al. |
| 6,714,711 B1 | 3/2004 | Lieberman et al. |
| 6,765,237 B1 | 7/2004 | Doxsee et al. |
| 6,847,170 B2 | 1/2005 | Kayser |
| 6,850,665 B2 | 2/2005 | Grubsky et al. |
| 6,853,131 B2 | 2/2005 | Srivastava et al. |
| 6,871,982 B2 | 3/2005 | Holman et al. |
| 6,890,234 B2 | 5/2005 | Bortscheller et al. |
| 6,908,205 B2 | 6/2005 | Greiner et al. |
| 6,917,057 B2 | 7/2005 | Stokes et al. |
| 6,939,481 B2 | 9/2005 | Srivastava et al. |
| 6,941,069 B2 | 9/2005 | Kaneko et al. |
| 6,965,709 B1 | 11/2005 | Weiss |
| 6,982,522 B2 | 1/2006 | Omoto et al. |
| 7,005,086 B2 | 2/2006 | Matsuno et al. |
| 7,006,306 B2 | 2/2006 | Falicoff et al. |
| 7,015,510 B2 | 3/2006 | Srivastava et al. |
| 7,026,756 B2 | 4/2006 | Shimizu et al. |
| 7,045,826 B2 | 5/2006 | Kim et al. |
| 7,071,616 B2 | 7/2006 | Shimizu et al. |
| 7,123,796 B2 | 10/2006 | Steckl et al. |
| 7,218,824 B2 | 5/2007 | Franklin et al. |
| 7,221,110 B2 | 5/2007 | Sears et al. |
| 7,230,222 B2 | 6/2007 | Cheng et al. |
| 7,251,389 B2 | 7/2007 | Lu et al. |
| 7,293,906 B2 | 11/2007 | Mok et al. |
| 7,425,798 B2 | 9/2008 | St.-Germain |
| 7,430,355 B2 | 9/2008 | Heikenfeld et al. |
| 7,607,815 B2 | 10/2009 | Pang |
| 7,638,754 B2 | 12/2009 | Morimoto et al. |
| 2001/0053072 A1 | 12/2001 | Takemoto |
| 2002/0118907 A1 * | 8/2002 | Sugama et al. ............. 385/14 |
| 2002/0122629 A1 | 9/2002 | Grubsky et al. |
| 2004/0012556 A1 | 1/2004 | Yong et al. |
| 2004/0196648 A1 | 10/2004 | Franklin et al. |
| 2004/0246697 A1 | 12/2004 | Yamashita et al. |
| 2004/0257352 A1 | 12/2004 | Naugler et al. |
| 2005/0100288 A1 | 5/2005 | Chu |
| 2005/0116667 A1 | 6/2005 | Mueller et al. |
| 2005/0243243 A1 | 11/2005 | Koganezawa |
| 2005/0258432 A1 | 11/2005 | Cho |
| 2006/0001037 A1 | 1/2006 | Schardt et al. |
| 2006/0002146 A1 | 1/2006 | Baba |
| 2006/0008205 A1 | 1/2006 | Meir et al. |
| 2006/0012286 A1 | 1/2006 | Cull et al. |
| 2006/0092346 A1 | 5/2006 | Moon et al. |
| 2006/0098434 A1 | 5/2006 | Liu et al. |
| 2006/0131924 A1 | 6/2006 | Reck |
| 2006/0164840 A1 | 7/2006 | Song et al. |
| 2006/0193133 A1 | 8/2006 | Von Der Brelie |
| 2006/0203502 A1 | 9/2006 | Stevens et al. |
| 2006/0208670 A1 | 9/2006 | Chang et al. |
| 2006/0221610 A1 | 10/2006 | Chew et al. |
| 2006/0227085 A1 | 10/2006 | Boldt et al. |
| 2006/0262250 A1 | 11/2006 | Hobbs |
| 2006/0290253 A1 | 12/2006 | Yeo et al. |
| 2007/0057626 A1 | 3/2007 | Kurihara et al. |
| 2007/0086211 A1 | 4/2007 | Beeson et al. |
| 2007/0133210 A1 | 6/2007 | Watson et al. |
| 2007/0133935 A1 | 6/2007 | Fine |
| 2007/0138966 A1 | 6/2007 | Marka et al. |
| 2007/0188425 A1 | 8/2007 | Saccomanno |
| 2007/0274094 A1 | 11/2007 | Schultz et al. |
| 2007/0284600 A1 | 12/2007 | Shchekin et al. |
| 2008/0061683 A1 | 3/2008 | Bertram |
| 2008/0094348 A1 | 4/2008 | Yin et al. |
| 2008/0122365 A1 | 5/2008 | Decius et al. |
| 2008/0151576 A1 | 6/2008 | Inditsky |
| 2008/0192458 A1 | 8/2008 | Li |
| 2008/0205080 A1 | 8/2008 | Erchak et al. |
| 2008/0212315 A1 | 9/2008 | Cornelissen et al. |
| 2008/0239749 A1 | 10/2008 | Saccomanno et al. |
| 2008/0251690 A1 | 10/2008 | Keiper et al. |
| 2008/0252571 A1 | 10/2008 | Hente et al. |
| 2008/0297644 A1 | 12/2008 | Farchtchian et al. |
| 2008/0305439 A1 | 12/2008 | Khan |
| 2008/0316605 A1 | 12/2008 | Hazell et al. |
| 2009/0001397 A1 | 1/2009 | Fine et al. |
| 2009/0002668 A1 | 1/2009 | Rohe et al. |
| 2009/0016060 A1 | 1/2009 | Nakao |
| 2009/0027588 A1 | 1/2009 | Medendorp, Jr. et al. |
| 2009/0046453 A1 | 2/2009 | Kramer |
| 2009/0046978 A1 | 2/2009 | Yasuda et al. |
| 2009/0052205 A1 | 2/2009 | Chen et al. |
| 2009/0059553 A1 | 3/2009 | Lin |
| 2009/0116801 A1 | 5/2009 | Fine |
| 2009/0129115 A1 | 5/2009 | Fine et al. |
| 2009/0141476 A1 | 6/2009 | Meir et al. |
| 2009/0151575 A1 | 6/2009 | Eisendrath |
| 2009/0161341 A1 | 6/2009 | Meir et al. |
| 2009/0161361 A1 | 6/2009 | Meir et al. |
| 2009/0161369 A1 | 6/2009 | Regev et al. |
| 2009/0162015 A1 | 6/2009 | Meir et al. |
| 2009/0212718 A1 | 8/2009 | Kawashima et al. |
| 2009/0225565 A1 | 9/2009 | Zimmermann et al. |
| 2009/0225566 A1 | 9/2009 | Zimmermann et al. |
| 2009/0284177 A1 | 11/2009 | Pedersen |
| 2009/0290380 A1 | 11/2009 | Meir et al. |
| 2009/0303412 A1 | 12/2009 | Ake et al. |
| 2009/0310338 A1 | 12/2009 | Negley |
| 2009/0322251 A1 | 12/2009 | Hilgers |
| 2010/0002414 A1 | 1/2010 | Meir et al. |
| 2010/0008628 A1 | 1/2010 | Shani |
| 2010/0033420 A1 | 2/2010 | Jheng |
| 2010/0045189 A1 | 2/2010 | Storch et al. |

FOREIGN PATENT DOCUMENTS

| | | |
|---|---|---|
| EP | 0911658 | 4/1999 |
| EP | 1 376 708 A | 1/2004 |
| EP | 1521503 A1 | 4/2005 |
| EP | 1876385 A2 | 1/2008 |
| EP | 1901587 A2 | 3/2008 |
| EP | 1988752 A1 | 11/2008 |
| EP | 2018089 A2 | 1/2009 |
| GB | 512062 A | 8/1939 |

| | | | |
|---|---|---|---|
| GB | 2339318 A | 1/2000 |
| GB | 2 343 361 | 5/2000 |
| GB | 2448564 | 10/2008 |
| JP | 5-127158 | 5/1993 |
| JP | 10-247412 A | 9/1998 |
| JP | 2004-241282 | 8/2004 |
| JP | 2005-085718 | 3/2005 |
| WO | WO 96-23649 | 8/1996 |
| WO | WO-97-31219 | 8/1997 |
| WO | WO-99012400 | 3/1999 |
| WO | WO-0182657 A1 | 11/2001 |
| WO | WO-02095289 A1 | 11/2002 |
| WO | WO-03-050448 | 6/2003 |
| WO | WO-03/065201 A1 | 8/2003 |
| WO | WO-2004-017109 | 2/2004 |
| WO | WO-2004034362 A2 | 4/2004 |
| WO | WO-2004-053531 | 6/2004 |
| WO | WO-2005096258 A1 | 10/2005 |
| WO | WO-2005101070 A1 | 10/2005 |
| WO | WO-2006-131924 A | 12/2006 |
| WO | WO-2007071397 A1 | 6/2007 |
| WO | WO-2008013097 A1 | 1/2008 |
| WO | WO-2008035282 A1 | 3/2008 |
| WO | WO-2008059445 A2 | 5/2008 |
| WO | WO-2008-146290 A3 | 12/2008 |

OTHER PUBLICATIONS

Office Action in Israel Patent Application No. 169122, dated Dec. 22, 2008 (translation).
Allen et al., "A nearly ideal phosphor-converted white light-emitting diode" *Appl. Phys. Ltrs.* 92: 143309 (2008).
Beeson et al., "61.5: LED-Based Light-Recycling Light Sources for Projection Displays," *SID Symp. Dig. of Tech. Papers*, 37(1): 1823-1826 (2006).
Fine, "Back Light Modular Unit (BLMu) for large LCD screens", SIL 2006.
International Search Report and Written Opinion for PCT/IL08/01553, mailed Mar. 25, 2009.
International Search Report and Written Opinion for PCT/IL2006/00066, dated Jun. 10, 2008.
International Search Report for PCT/IL2003/01042, mailed Jul. 29, 2004.
International Search Report for PCT/IL2008/000730, mailed Nov. 25, 2008.
Smith-Gillespie, R., "LCD Backlighting Options and Design Considerations", SID Display Applications Tutorial, May 22, 2008.
International Search Report and Written Opinion for PCT/IL2006/000667, dated Jun. 10, 2008.

* cited by examiner

WAVEGUIDE SHEET CONTAINING IN-COUPLING, PROPAGATION, AND OUT-COUPLING REGIONS

CROSS-REFERENCE TO RELATED APPLICATIONS

This application claims priority to and the benefit of U.S. Provisional Patent Application No. 61/006,110, filed on Dec. 19, 2007; U.S. Provisional Patent Application No. 61/064,384, filed on Mar. 3, 2008; U.S. Provisional Patent Application No. 61/127,095, filed on May 9, 2008; U.S. Provisional Patent Application No. 61/076,427, filed on Jun. 27, 2008; and U.S. Provisional Patent Application No. 61/135,098, filed on Jul. 16, 2008. The entire disclosure of each of these applications is incorporated by reference herein.

TECHNICAL FIELD

In various embodiments, the present invention relates to optics, and in particular to optical waveguides.

BACKGROUND

The technology to transmit and guide light through optical systems exploits a physical phenomenon in which light is confined within a material surrounded by other materials with lower refractive index. Such optical systems are generally referred to as optical waveguides, and are employed to direct, diffuse, and/or polarize light in many applications, e.g., optical communication and illumination.

When a ray of light moves within a transparent substrate and strikes one of its internal surfaces at a certain angle, the ray of light is either reflected from the surface or refracted into the open air in contact with the substrate. The condition according to which the light is reflected or refracted is determined by Snell's law, which relates the impinging angle, the refracting angle (in the case of refraction) and the refractive indices of both the substrate and the air. Broadly speaking, depending on the wavelength of the light, for a sufficiently large impinging angle (above the "critical angle") no refraction occurs, and the energy of the light is trapped within the substrate. In other words, the light is reflected from the internal surface as if from a mirror. Under these conditions, total internal reflection is said to take place.

Many optical systems operate according to the principle of total internal reflection. Optical fiber represents one such system. Optical fibers are transparent, flexible rods of glass or plastic, basically composed of a core and cladding. The core is the inner part of the fiber, through which light is guided, while the cladding surrounds it completely. The refractive index of the core is higher than that of the cladding, so that light in the core impinging the boundary with the cladding at an angle equal to or exceeding the critical angle is confined in the core by total internal reflection. Thus, geometric optics may be used to derive the largest angle at which total internal reflection occurs. An important parameter of every optical fiber (or any other light-transmitting optical system) is known as the "numerical aperture," which is defined as the sine of the largest incident light ray angle that is successfully transmitted through the optical fiber, multiplied by the index of refraction of the medium from which the light ray enters the optical fiber.

Another optical system designed for guiding light is the graded-index optical fiber, in which the light ray is guided by refraction rather than by total internal reflection. In this optical fiber, the refractive index decreases gradually from the center outwards along the radial direction, and finally drops to the same value as the cladding at the edge of the core. As the refractive index does not change abruptly at the boundary between the core and the cladding, there is no total internal reflection. However, the refraction nonetheless bends the guided light rays back into the center of the core while the light passes through layers with lower refractive indices.

Another type of optical system is based on photonic materials, where light is confined within a bandgap material surrounding the light. In this type of optical system, also known as a photonic material waveguide, the light is confined in the vicinity of a low-index region. One example of a photonic material waveguide is a silica fiber having an array of small air holes throughout its length.

International Patent Application Publication No. WO2004/053531, the entire contents of which are hereby incorporated by reference, discloses a waveguide for propagating and emitting light. The waveguide is made of a flexible, multilayer waveguide material in which the refractive index of one layer is larger than the refractive index of the other layers to allow propagation of light via total internal reflection. One layer of the waveguide material comprises one or more impurities which scatter the light to thereby emit a portion thereof through the surface of the waveguide material.

Impurities for light scattering are also employed in light diffusers (also known as light-scattering films or diffusing films), which diffuse light from a source in order to attain a uniform luminance. For example, in a liquid crystal display device a light diffuser is placed between the light source or light reflector and the liquid crystal panel so as to diffuse the illuminating light, allowing the device to be used as a plane or flat light source as well as enhancing the luminance on the front side of the device.

Conventional illumination apparatuses capable of emitting diffused light with uniform luminance are complicated to manufacture and too large for many applications. They tend to be unitary and large rather than small and scalable. Additionally, such apparatuses often exhibit insufficient color mixing and diffusion to emit light with a high degree of color and luminance uniformity.

SUMMARY

The foregoing limitations of conventional illumination apparatuses are herein addressed by utilizing a waveguide that incorporates spatially distinct in-coupling, propagation, and out-coupling regions and/or that is easily manufactured as a group of aligned core structures. Generally, embodiments of the invention propagate and diffuse light until it exits though a surface of the waveguide device or a portion thereof; for example, light entering the in-coupling region is substantially retained within the waveguide until it is emitted from the out-coupling region. Embodiments of the invention successfully provide an optical waveguide device that may be tiled or overlapped. As further detailed herein, the optical properties of the waveguide may be tailored to the requirements of particular applications.

In one aspect, embodiments of the invention feature an illumination structure including a substantially non-fiber waveguide. The waveguide may include or consist essentially of a discrete in-coupling region for receiving light, a discrete propagation region for propagating light substantially without emission, and a discrete out-coupling region for emitting light. The illumination structure may include a first cladding layer that is disposed over (and may be in direct physical contact with) the top surface of the waveguide, as well as a second cladding layer that is disposed over (and may be in direct physical contact with) the bottom surface of the waveguide. The in-coupling region and/or the out-coupling region may include a plurality of scattering particles, and the propagation region may be substantially free of scattering particles. The scattering particles may have a concentration that varies across at least one dimension of the out-coupling region, and the concentration of scattering particles may increase with distance from the in-coupling region.

Embodiments of the invention may feature one or more of the following. The out-coupling region may include or consist essentially of a plurality of core structures, at least some of which include a plurality of scattering particles. At least one of the size, the concentration, or the type of the scattering particles may vary among at least two of the core structures. There may be substantially no overlap between individual core structures in a direction perpendicular to a general direction of light propagation therethrough. Each of the core structures may have a substantially quadrilateral cross-sectional area. The cross-sectional area may be rectangular. The illumination structure may further include means for emitting light disposed proximate the in-coupling region and/or disposed within the waveguide. A reflector may be disposed proximate a surface of the in-coupling region. The waveguide may be substantially planar. The optical mean free path of light in the propagation region may be substantially constant, and the optical mean free path of light in the out-coupling region may vary substantially monotonically.

The illumination structure may include a second substantially non-fiber waveguide disposed above and/or in direct contact with the substantially non-fiber waveguide. The second substantially non-fiber waveguide may include or consist essentially of a discrete in-coupling region for receiving light, a discrete propagation region for propagating light, and a discrete out-coupling region for emitting light. The out-coupling region of the substantially non-fiber waveguide may be substantially vertically aligned with the out-coupling region of the second substantially non-fiber waveguide.

In another aspect, embodiments of the invention feature a method of producing light. The method includes providing a substantially non-fiber waveguide including or consisting essentially of a discrete in-coupling region for receiving light, a discrete propagation region for propagating light without emission, and a discrete out-coupling region for emitting light. The method also includes emitting light proximate the in-coupling region, whereby the light propagates through the propagation region with substantially no emission therefrom into the out-coupling region. The light is emitted from the out-coupling region.

These and other objects, along with advantages and features of the present invention herein disclosed, will become more apparent through reference to the following description, the accompanying drawings, and the claims. Furthermore, it is to be understood that the features of the various embodiments described herein are not mutually exclusive and may exist in various combinations and permutations.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which:

FIG. 12b is an exploded view of a display device incorporating the illumination panel depicted in FIG. 12a.

DETAILED DESCRIPTION

Figure 1A:
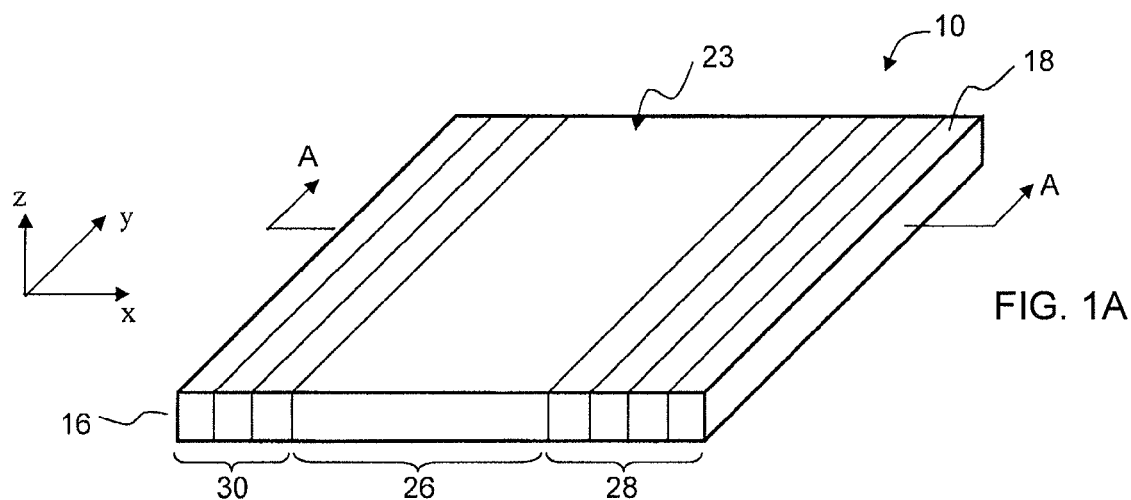
FIG. 1a is a schematic illustration showing a perspective view of an optical waveguide device which comprises a plurality of core structures joined in a side-by-side configuration, according to some embodiments of the present invention.

FIGS. 1a-1h illustrate an optical waveguide device 10 according to various exemplary embodiments of the present invention. Device 10 generally has an open shape (i.e., non-tubular) such as the shape of a sheet, e.g., a planar sheet. Typically, device 10 is a non-fiber device, i.e., not a substantially cylindrical waveguide in which a light-conducting core is surrounded by a layer of cladding, and is solid (i.e., not hollow). In various exemplary embodiments of the invention the sheet is flexible and hence may be also assume a non-planar shape. For example, when the sheet is placed on a curved surface, the sheet may acquire the curvature of the surface. Device 10 may also have a certain degree of elasticity. Thus, one or more of the layers of device 10 may be made, for example, from an elastomer. In some embodiments, device 10 is substantially rigid.

Device 10 includes a core layer 16 formed of a plurality of core structures 18 joined in, e.g., a side-by-side or nested configuration. Core structures 18 (designated in FIGS. 1a-1h by reference numerals 18-1, 18-2, . . . , 18-n) may take the form of elongated bands arranged side-by-side (see, e.g., FIG. 1a), or may instead have a nested configuration (see, e.g., FIG. 1h) with their common ends joined. The width of structures 18 (along the x direction in FIGS. 1a-1h) may vary.

For clarity of presentation device 10 is shown as planar, with layer 16 being parallel to the x-y plane, and each elongated core structure 18 extending along the y direction. The ordinarily skilled person would know how to tailor the following description for non-planar devices. For example, each section of a non-planar sheet may be described using a Cartesian x-y-z coordinate system which is rotated such that the section is tangential to the x-y plane and normal to the z direction. The x, y and z directions are referred to herein as the "lateral," "longitudinal" and "normal" directions, respectively.

Although core structures 18 are shown in FIGS. 1a-1g as having a rectangular cross-section, this need not necessarily be the case, depending on the application.

Figure 1B:
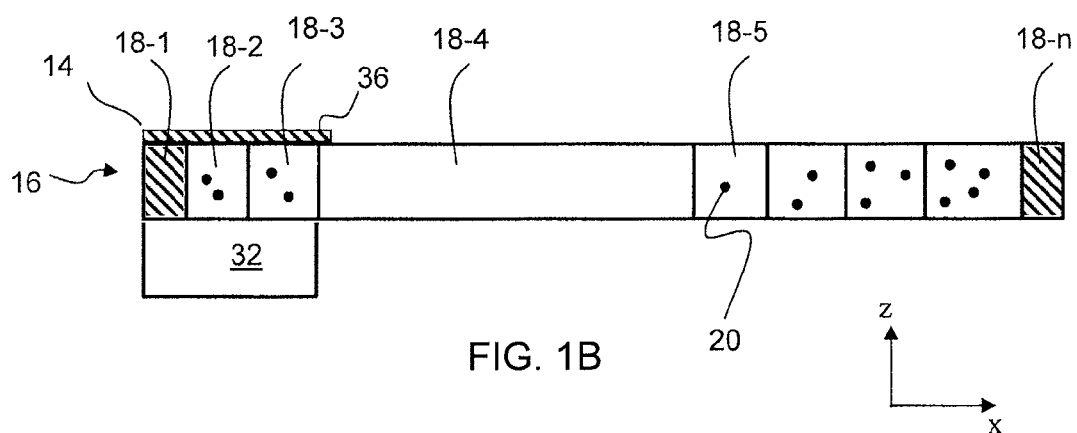
FIG. 1b is a schematic illustration showing a cross-sectional view along the line A-A of FIG. 1a, according to some embodiments of the present invention.

With more specific reference to FIGS. 1a and 1b, FIG. 1a is a perspective view of device 10 and FIG. 1b is a cross-sectional view along the line A-A of FIG. 1a in embodiments in which core layer 16 is at least partially surrounded by air. FIG. 1b is a cross-sectional view along the line A-A of a device similar to that illustrated FIGS. 1a and 1h in embodiments in which core layer 16 is at least partially surrounded by air.

In embodiments in which core layer 16 is at least partially surrounded by air, structures 18 are characterized by a refractive index which is larger than the refractive index of the surrounding air. In such configuration, when light strikes the internal surface of layer 16 at an angle larger than the critical angle, $\theta_c \equiv \sin^{-1}(n_1/n_2)$, where $n_1$ and $n_2$ are the refractive indices of the air and the core layer, respectively, the light energy is trapped within core layer 16 and propagates therethrough via total internal reflection. Light may also propagate through device 10 when the impinging angle is smaller than the critical angle, in which case one portion of the light is emitted and the other portion thereof continues to propagate. The difference between the indices of refraction the core layer and surrounding air may be selected in accordance with the desired propagation angle of the light.

Typically, the refractive index of air is about 1; hence, core structures 18 typically include or consist essentially of a waveguide material having a refractive index greater than 1. Representative examples of waveguide materials suitable for the core structures include, without limitation, a thermoplastic such as a polycarbonate, polymethyl methacrylate (PMMA), and/or polyurethane (TPU) (aliphatic) with a refractive index of about 1.50, TPU (aromatic) with a refractive index of from about 1.58 to about 1.60, amorphous nylon such as GRILAMID supplied by EMS Grivory (e.g., GRILAMID TR90 with refractive index of about 1.54), polymethylpentene, e.g., TPX supplied by Mitsui with a refractive index of about 1.46, polyvinylidene fluoride (PVDF) with a refractive index of about 1.34, or other thermoplastic fluorocarbon polymers, and/or STYROLUX (UV stabilized) supplied by BASF with refractive index of about 1.58.

Figure 1C:
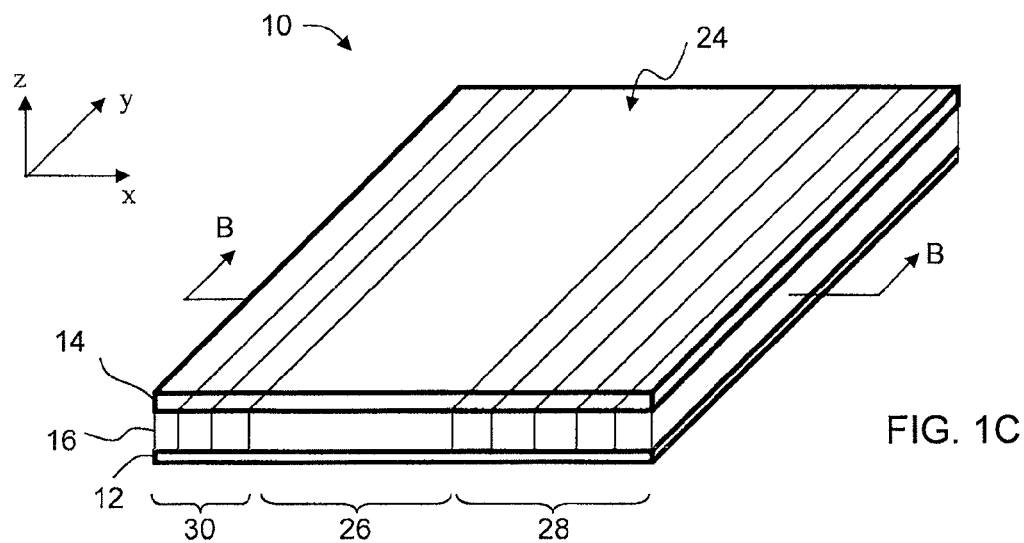
FIG. 1c is a schematic illustration showing a perspective view of the device optical waveguide device in embodiments in which the device comprises one or more cladding layers.
Figure 1D:
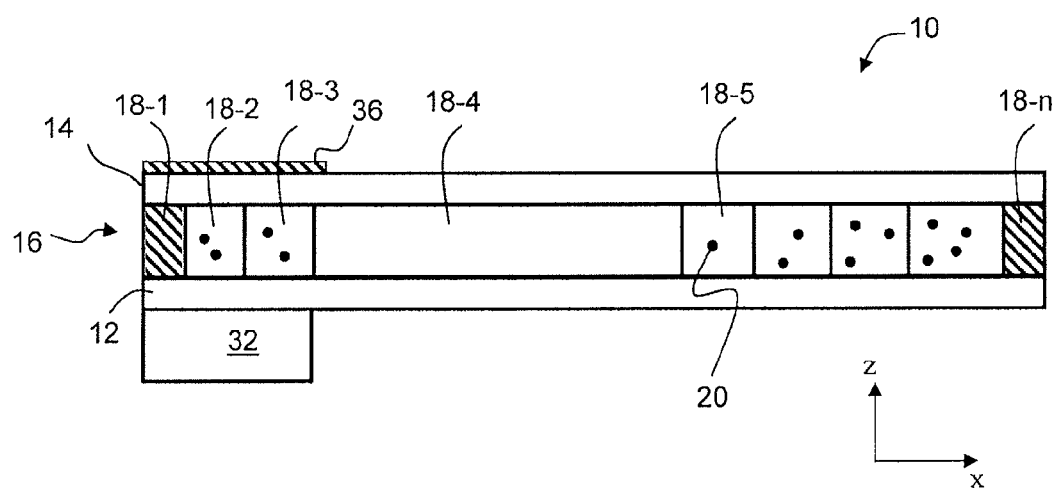
FIGS. 1d and 1e are schematic illustrations showing cross sectional views along line B-B of FIG. 1c.
Figure 1E:
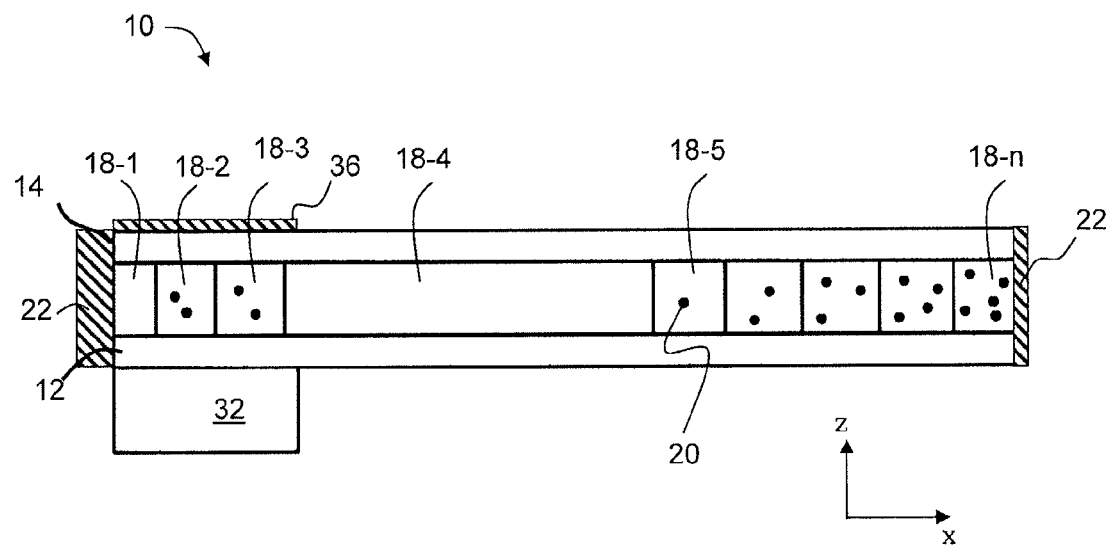

FIGS. 1c-1e are perspective (FIG. 1c) and cross-sectional (FIGS. 1d and 1e) views along line B-B of device 10 in embodiments in which device 10 further comprises one or more cladding layers. Although the core layer of the device shown in FIG. 1c is illustrated as having the core structures in a side-by-side configuration, this need not necessarily be the case, since, for some applications, it may be desired to have the core layer arranged in a nested configuration (e.g., the configuration schematically illustrated in FIG. 1h).

As shown in FIGS. 1c-1e, device 10 includes a first cladding layer 12, a second cladding layer 14, and core layer 16 interposed between cladding layers 12, 14. Typically, the elongated structures of core 16 extend along the length of the cladding layers.

The refractive index of the cladding layers is typically smaller than the refractive index of the core layer. As a result, when light strikes the internal surface of the cladding layers at an impinging angle larger than the critical angle ($\theta_c \equiv \sin^{-1}(n_1/n_2)$, where $n_1$ and $n_2$ are the refractive indices of the cladding and core layers, respectively), the light energy is trapped within core layer 16, and the light propagates therethrough. The light may also propagate through device 10 when the impinging angle is smaller than the critical angle, in which case one portion of the light is emitted and the other portion continues to propagate. The difference between the indices of refraction of the layers is preferably selected in accordance with the desired propagation angle of the light.

In the embodiments in which the cladding layers are employed, core structures 18 include or consist essentially of a waveguide material such as those identified above for the embodiment lacking cladding layers, and preferably have relatively high refractive indices.

In accordance with embodiments of the present invention, the indices of refraction are selected such that propagation angle is from about 2° to about 55°. For example, core layer 16 may be made of GRILAMID TR90 with a refractive index of about 1.54, and cladding layers 12, 14 may be made of TPX with refractive index of about 1.46, so that $\Delta n \equiv n_2 - n_1 \approx 0.08$ and $n_1/n_2 \approx 0.948$, corresponding to a propagation angle of $90° - \sin^{-1}(0.948)$, or approximately ±19°. In another example, a core layer 16 made of TPU (aromatic) with a refractive index of about 1.60 without cladding has a corresponding propagation angle of $90° - \sin^{-1}(1/1.6)$, or approximately ±51°.

Figure 1F:
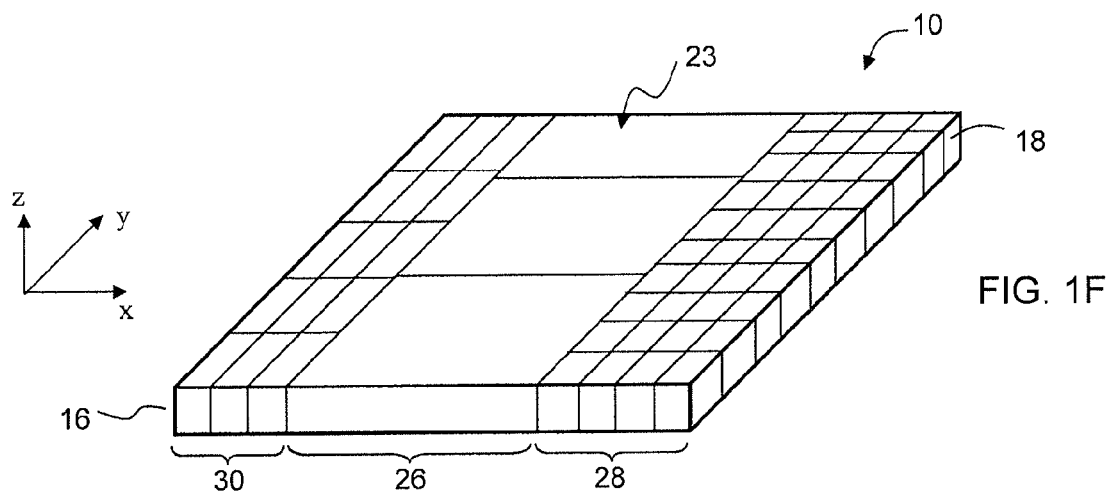
FIGS. 1f and 1g are schematic illustrations showing perspective views of the optical waveguide device without (FIG. 1f) and with (FIG. 1g) claddings, in an embodiment in which the core layer of the device is formed of core structures in the shape of plaques.
Figure 1G:
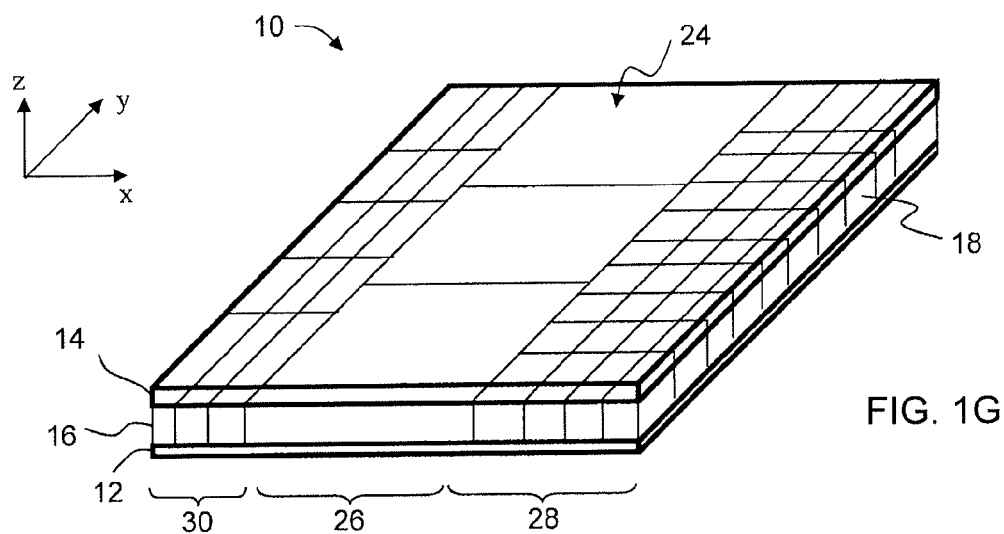
Figure 1H:
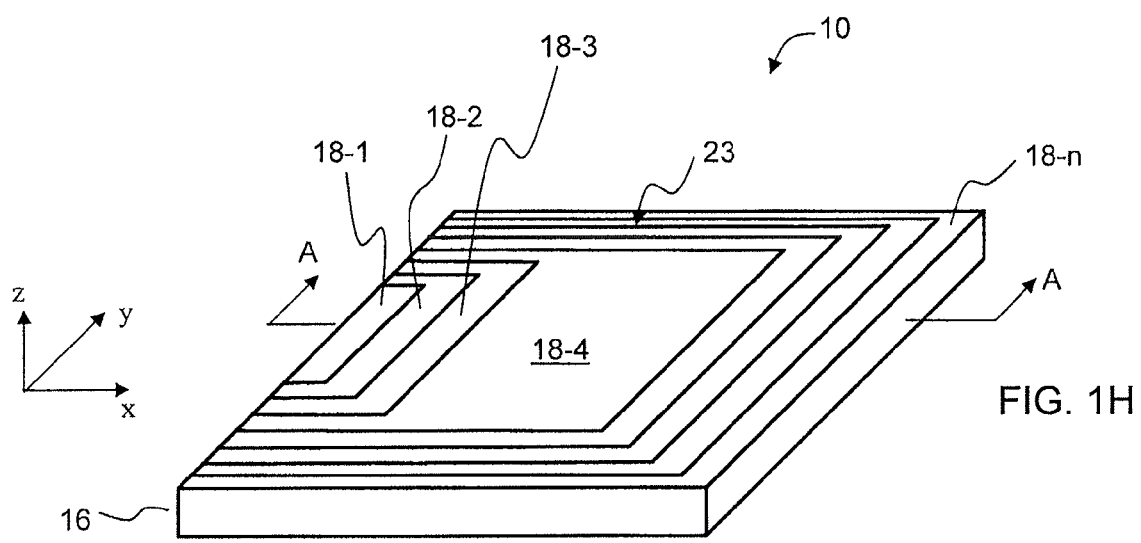
FIG. 1h is a schematic illustration showing a perspective view of an optical waveguide device which comprises a plurality of core structures joined in a nested configuration, according to some embodiments of the present invention.

In some embodiments of the invention, core structures 18 do not have elongated shapes. FIGS. 1f and 1g are perspective views of device 10 without (FIG. 1f) and with (FIG. 1g) claddings, in an embodiment in which core structures 18 are in the shape of plaques (e.g., polygonal plaques such as squares or rectangles). The ordinarily skilled person will know how to construct a cross-sectional view of these illustrations, which may be similar to FIGS. 1b, 1d and 1e.

The partitioning of core layer 16 into core structures 18 (elongated or shaped as plaques) may be accomplished by any process known in the art, such as, but not limited to, coextrusion, extrusion, coating, coinjection molding, lamination, tiling, and the like. For example, two adjacent structures may be welded at their joined ends, bonded by an adhesive material disposed along their length and/or width, etc. A process for forming core layer 16 according to some embodiments of the present invention is provided below.

Whether or not device 10 includes cladding layers, and irrespectively of the shape and arrangement of the core structures forming layer 16, some of the core structures include additives selected to provide the individual core structures with a predetermined effective refractive index. The effective refractive index depends on the type and concentration of the additive. Typically, higher additive concentrations provide higher effective refractive indices. The additives may take the form of light-scattering particles 20 embedded in one or more of the core structures. In various exemplary embodiments of the invention, the size, concentration, refractive index, and/or type of light-scattering particles 20 varies among at least two of the core structures.

Particles 20 are dispersed within core structures 18 and facilitate emission of the light from a surface 23 of core layer 16 and/or a surface 24 of cladding layer 14 (in the embodiments in which cladding layer 14 is employed). Particles 20 serve as scatterers and typically scatter optical radiation in more than one direction. When light is scattered by a particle 20 such that the impinging angle is below the critical angle, no total internal reflection occurs and the scattered light is emitted through surface 23 and/or surface 24.

The light-scattering particles may be beads, e.g., glass beads, or other ceramic particles, rubber particles, silica particles, particles including or consisting essentially of inorganic materials such as $BaSO_4$ or $TiO_2$, particles including or consisting essentially of a phosphor material (as further described below), and the like. In an embodiment, the light-scattering particles are substantially or even completely non-phosphorescent. Such non-phosphorescent particles merely scatter light without converting the wavelength of any of the light striking the particles. The term "light-scattering particles" may also refer to non-solid objects embedded in the waveguide material from which core structure are made, provided that such objects are capable of scattering the light. Representative example of suitable non-solid objects include, without limitation, closed voids within the core structures, e.g., air bubbles, and/or droplets of liquid embedded within the core structures. The light-scattering particles may also be organic or biological particles, such as, but not limited to, liposomes. In some embodiments, optical elements such as microlenses are utilized in conjunction with, or even instead of, light-scattering particles. In other embodiments, optical elements include or consist essentially of structures such as hemispheres or diffusive dots. In such embodiments, the optical elements function to out-couple light propagating through device 10. As utilized herein, "optical elements" may generically refer to elements such as microlenses as well as light-scattering particles, e.g., non-photoluminescent particles.

In accordance with various embodiments of the present invention, the concentration, size and/or type of particles is selected such as to provide illumination at a predetermined profile (e.g., intensity profile) from predetermined regions of surface 23 or 24. For example, in regions of device 10 where a larger portion of the propagated light is to be emitted through the surface, the concentration of particles 20 may be large and/or the particles may have a type and/or size which provides them with high scattering properties; in regions where a smaller portion of the light is to be emitted the concentration of particles 20 may be smaller and/or the particles may have a type and/or size which provides them with lower scattering properties; and in surface regions from which no light is to be emitted, substantially no particles are embedded in core structures 18.

As will be appreciated by one ordinarily skilled in the art, the energy trapped in waveguide device 10 decreases each time a light ray is emitted through surface 23 or 24. On the other hand, it may be desired to use device 10 to provide a uniform surface illumination. Thus, as the overall amount of energy decreases with each emission, a uniform surface illumination may be achieved by gradually increasing the ratio between the emitted light and the propagated light. According to some embodiments of the present invention, the increasing ratio of emitted light to propagated light is achieved by an appropriate selection of the distribution, type, refractive index, and/or size of particles 20 in the core layer 16. For example, at regions in which it is desired to have uniform surface illumination, the concentration of particles 20 may be an increasing function of the optical distance traversed by the propagated light.

Generally, the optical output at specific and predetermined regions may be controlled by arranging the core structures 18 such that different core structures have different concentrations, sizes, refractive indices, and/or types of particles 20.

In various exemplary embodiments of the invention, the core structures 18 are arranged to define a first zone 26 and a second zone 28. First and second zones 26, 28 may include portions of core layer 16 such that a profile of an optical mean free path characterizing core layer 16 is generally flat across the first zone 26 and monotonically varying across the second zone 28.

The optical mean free path may be measured directly by positioning a bulk material in front of a light-emitting element and measuring the optical output through the bulk at a given direction as a function of the thickness of the bulk. Typically, when a bulk material, t mm in thickness, reduces the optical output of a light source at the forward direction by 50%, the material is said to have a mean free path of t mm.

Figure 2A:
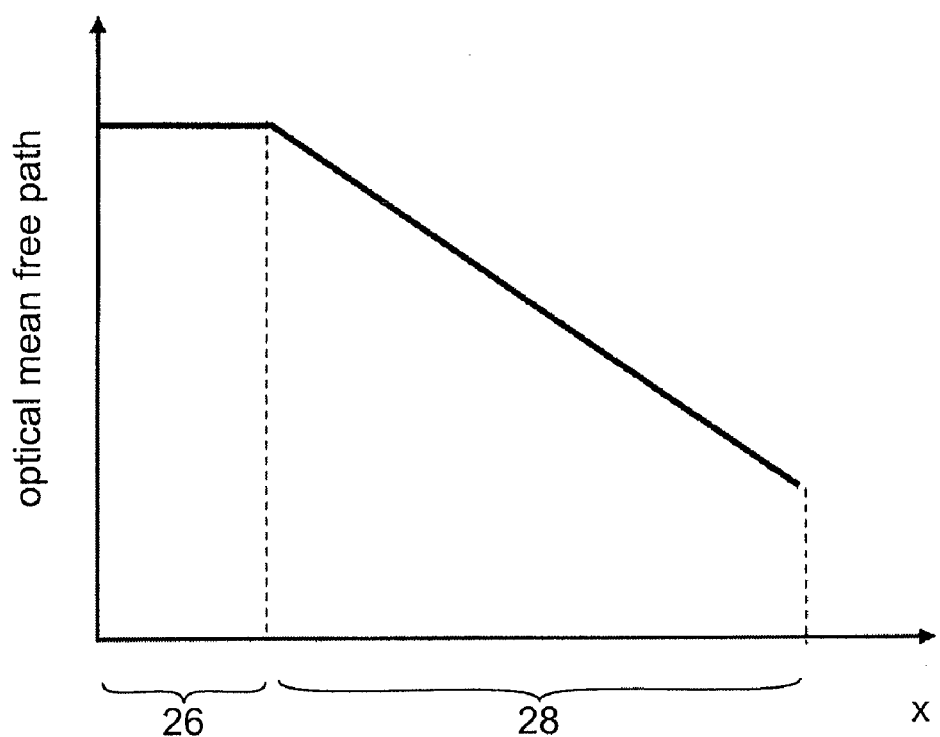
FIGS. 2a and 2b show representative examples of an optical mean free path as a function of a lateral direction, according to some embodiments of the present invention.

FIG. 2a shows a representative example of an optical mean free path as a function of the lateral direction x. As shown, the optical mean free path is substantially constant in zone 26, and is a decreasing function of x in zone 28. The decrement of the optical mean free path in region 28 facilitates an increasing ratio between the emitted portion and propagated portions of the light.

Zone 26 may include one or more core structures and is typically devoid of light-scattering particles 20. In this embodiment, zone 26 propagates light with minimal or no emissions from surfaces 23 or 24, i.e., zone 26 is a propagation region. Zone 28 may include a plurality, e.g., three or more, of core structures 18 each having particles 20 embedded therein. In such an embodiment, zone 28 provides illumination by out-coupling light from core 16 (i.e., zone 28 is an out-coupling region for light propagated through zone 26). The brightness of the illumination from zone 28 may be substantially uniform.

Brightness uniformity may be calculated by considering the luminance deviation across the range of azimuthal angles as a fraction of the average luminance across that range. A more simple definition of the brightness uniformity BU is $BU=1-(L_{MAX}-L_{MIN})/(L_{MAX}+L_{MIN})$, where $L_{MAX}$ and $L_{MIN}$ are, respectively, the maximal and minimal luminance values across the predetermined range of azimuthal angles.

The term "substantially uniform brightness" refers to a BU value which is at least 0.8 when calculated according to the above formula. In some embodiments of the invention the value of BU is at least 0.85, more preferably at least 0.9, and still more preferably at least 0.95.

To achieve a decreasing optical mean free path, the concentration of particles 20 in the core structures 18 of zone 28 may be an increasing function of the distance from zone 26. Alternatively or additionally, the type and/or size of the particles in the individual core structures 18 of zone 28 may vary to achieve the desired profile. As shown in FIG. 1b, the concentration, type, size, and/or refractive index of particles 20 in zone 28 may change in a direction of light propagation through device 10 (denoted as the x direction in FIG. 1b). However, for any cross-section through zone 28, the concentration, type, size, and/or refractive index of particles 20 may be substantially constant in at least one of the directions perpendicular to the light-propagation direction (e.g., the y and z directions in FIG. 1b). For example, each core structure 18 in zone 28 may have a substantially constant concentration, type, size, and/or refractive index of particles 20 therewithin, but this value may change in at least one (or every) other core structure 18 in zone 28.

Figure 2B:
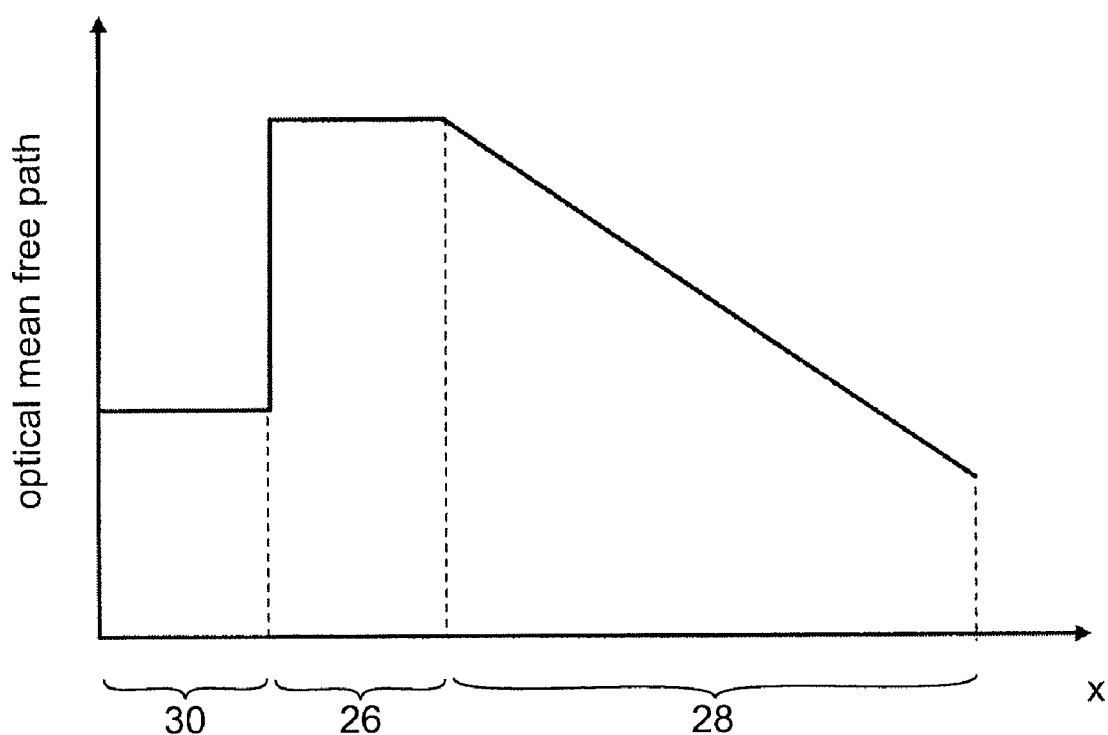

Some embodiments of the present invention include a third zone 30. As shown in FIG. 1a, third zone 30 may be proximate or in direct contact with first zone 26 and away from second zone 28. Third zone 30 may comprise or consist essentially of one or more core structures 18 having light-scattering particles 20 embedded therein. A representative example of an optical mean free path in the embodiment in which three zones are defined is illustrated in FIG. 2b.

Zone 30 may be an in-coupling region for facilitating the entry of light into device 10. Light enters device 10 at zone 30, propagates through zone 26 and exits (i.e., is out-coupled) at zone 28. One or more of the core structures 18, typically the first and last structures (i.e., structures 18-1 and 18-n in the illustration of FIG. 1d) may be made light-reflective so as to prevent or reduce optical losses through the side(s) of device 10. The characteristic refractive index of such light-reflective core structures 18 is preferably above 2. A representative example of a material having a sufficiently high refractive index suitable for the present embodiment is $TiO_2$, which has a refractive index of about 2.5. Alternatively, light-reflective structures 22 may be disposed proximate the entire height of device 10 as shown in FIG. 1e.

Coupling of light into device 10 may be facilitated using an optical funnel 32 positioned adjacent to layer 12 or layer 16 at zone 30. Funnel 32 is preferably configured to receive light from one or more light-emitting elements and to transmit the light into layer 12 or layer 16. The principle of operation of funnel 30 according to some embodiments of the present invention is further detailed herein under with reference to FIG. 4.

To prevent or reduce optical losses through the portion of cladding layer 14 which overlaps zone 30, device 10 may further include one or more light reflectors 36 adjacent to cladding layer 14 at the region of cladding layer 14 which overlaps zone 30. Reflector(s) 36 reduce illumination in any direction other than a circumferential direction.

In various exemplary embodiments of the invention, zone 30 of device 10 includes one or more components that cause the light exiting zone 30 (into zone 26) to have a predetermined optical profile, such as, but not limited to, a substantially uniform color profile or substantially uniform white light. This embodiment may be implemented by color mixing, optical means, or may be implemented via luminescence, a phenomenon in which energy is absorbed by a substance, commonly called a luminescent, and is emitted in the form of light. The wavelength of the emitted light differs from the characteristic wavelength of the absorbed energy (the characteristic wavelength equals hc/E, where h is the Plank's constant, c is the speed of light and E is the energy absorbed by the luminescent). Luminescence is a widely occurring phenomenon which may be classified according to the excitation mechanism as well as according to the emission mechanism. Examples of such classifications include photoluminescence and electroluminescence. Photoluminescence is sub-classified to fluorescence and phosphorescence.

A photoluminescent is generally a material which absorbs energy is in the form of light. A fluorescent material is a material which emits light upon return to the base state from a singlet excitation, and a phosphorescent materials is a material which emits light upon return to the base state from a triplet excitation. In fluorescent materials, or fluorophores, the electron de-excitation occurs almost spontaneously, and the emission ceases when the source of the energy exciting the fluorophore is removed. In phosphor materials, or phosphors, the excitation state involves a change of spin state, which decays only slowly. In phosphorescence, light emitted by an atom or molecule persists after the excitation source is removed.

Photoluminescent materials are used according to various embodiments of the present invention for altering the color of light. Since blue light has a short wavelength (compared, e.g., to green or red light), and since the light emitted by a photoluminescent material has a longer wavelength than the absorbed light, blue light generated by a blue light-emitting element such as a light-emitting diode (LED) may be readily converted to visible light having a longer wavelength. Accordingly, in various exemplary embodiments of the invention a specific light profile on the exit of light into zone 26 is provided using one or more photoluminescent layers disposed on or embedded in device 10.

The term "photoluminescent layer" is commonly used herein to describe one photoluminescent layer or a plurality of photoluminescent layers. Additionally, a photoluminescent layer may include one or more types of photoluminescent species. In any event, a photoluminescent layer is characterized by an absorption spectrum (i.e., a range of wavelengths of light absorbed by the photoluminescent molecules to effect quantum transition to a higher energy level) and an emission spectrum (i.e., a range of wavelengths of light emitted by the photoluminescent molecules as a result of quantum transition to a lower energy level). The emission spectrum of the photoluminescent layer is typically wider and shifted relative to its absorption spectrum. The difference in wavelength between the apex of the absorption and emission spectra of the photoluminescent layer is referred to as the Stokes shift of the photoluminescent layer.

The absorption spectrum of the photoluminescent layer preferably overlaps, at least partially, the emission spectrum of the light source which feeds device 10. More preferably, for each characteristic emission spectrum of the light source, there is at least one photoluminescent layer having an absorption spectrum overlapping the characteristic emission spectrum. According to some embodiments of the present invention, the apex of the source's emission spectrum lies in the spectrum of the photoluminescent layer, and/or the apex of the photoluminescent layer's absorption spectrum lies in the spectrum of the light source.

The photoluminescent layer may "convert" the wavelength of a portion of the light emitted by the light source. More specifically, for each photon which is successfully absorbed by the layer, a new photon is emitted. Depending on the type of photoluminescent, the emitted photon may have a wavelength which is longer or shorter than the wavelength of the absorbed photon. Photons which do not interact with the photoluminescent layer propagate therethrough. The combination of converted light and non-converted light forms the profile of light entering zone 26. This "mixed" light is preferably spectrally different from each of the converted light and the non-converted light. Since the mixed light is formed by the superposition of the converted light and the non-converted light, the spectrum of the mixed light generally contains all of the wavelengths of the converted light and the non-converted light.

In preferred embodiments, the photoluminescent material is disposed neither on an outer surface of device 10 nor directly on a light-emitting element 34. Rather, as described further below, the photoluminescent material (e.g., in the form of particles and/or a layer or layers) is disposed within device 10 some distance away from light-emitting element 34.

Figure 3A:
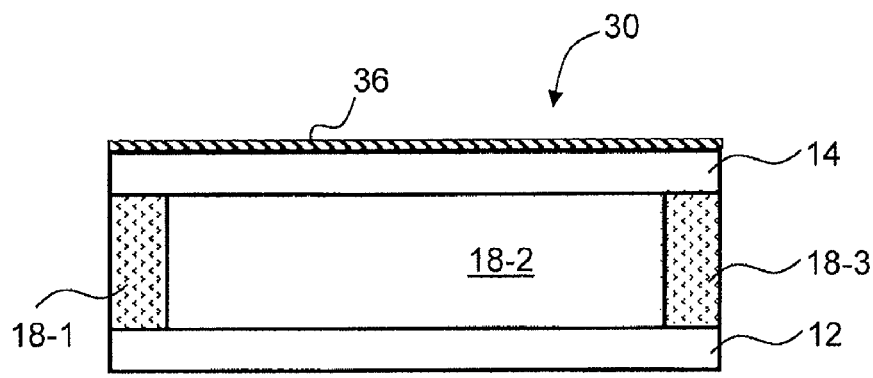
FIGS. 3a-3d are schematic illustrations showing fragmentary cross-sectional views of the device, according to some embodiments of the present invention.
Figure 3B:
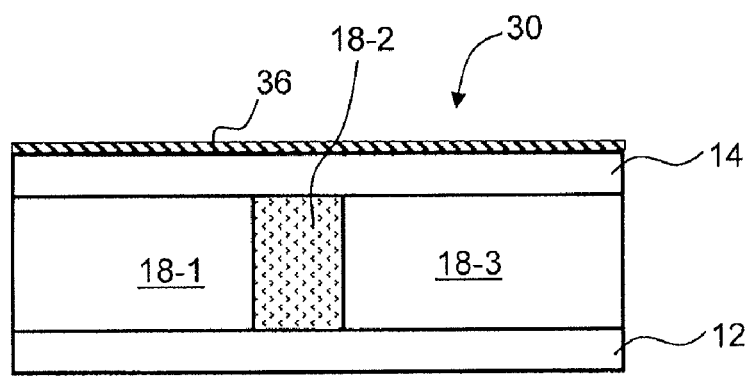
Figure 3C:
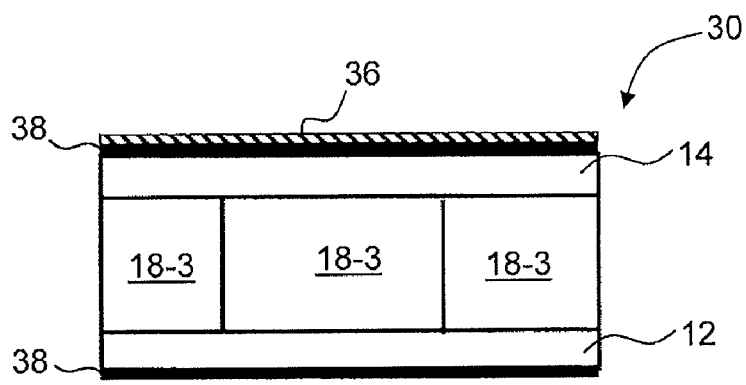

FIGS. 3*a-d* are fragmentary schematic illustrations of device 10 showing a cross-section of zone 30 parallel to the z-x plane. Several components of device 10 are omitted from FIGS. 3*a-d* for clarity of presentation. FIG. 3*a* illustrates an embodiment in which the elongated structures at the ends of zone 30 (structures 18-1 and 18-3, in the present example) include or consist essentially of photoluminescent material, e.g., a phosphor or a fluorophore. FIG. 3*b* illustrates an embodiment in which one or more of the inner elongated structures of zone 30 (structure 18-2, in the present example) include or consist essentially of photoluminescent material. FIG. 3*c* is a schematic illustration of an embodiment in which a photoluminescent layer 38, which may include or consist essentially of a photoluminescent material such as a phosphor or a fluorophore, is disposed on the surface of layer 12 and/or layer 14. In this embodiment, the wavelength of the light is changed via the multiple impingements of the light on surface of layer 12 and/or 14. In an embodiment, only one of the surfaces is coated by the photoluminescent layer 38. For example, the surface of layer 14 may be coated by the photoluminescent layer 38 and the surface of layer 12 may be left exposed for better light coupling between layer 12 and the light-emitting element or funnel 32.

Figure 3D:
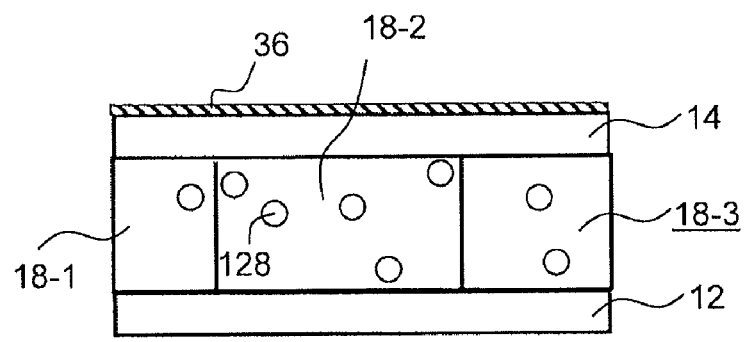

Photoluminescent material may also be incorporated in the form of particles, as illustrated in FIG. 3*d*. A plurality of photoluminescent particles 128 may be distributed within one or more of the core structures 18 in accordance with the desired light output profile. For example, in one embodiment, the particles 128 are uniformly distributed in all the core structures 18. In another embodiment, the particles are distributed such that there are core structures 18 with a higher population of the particles 128 and core structures 18 with a lower population of the particles 128, depending on the desired profile in or near each core structure.

Figure 4A:
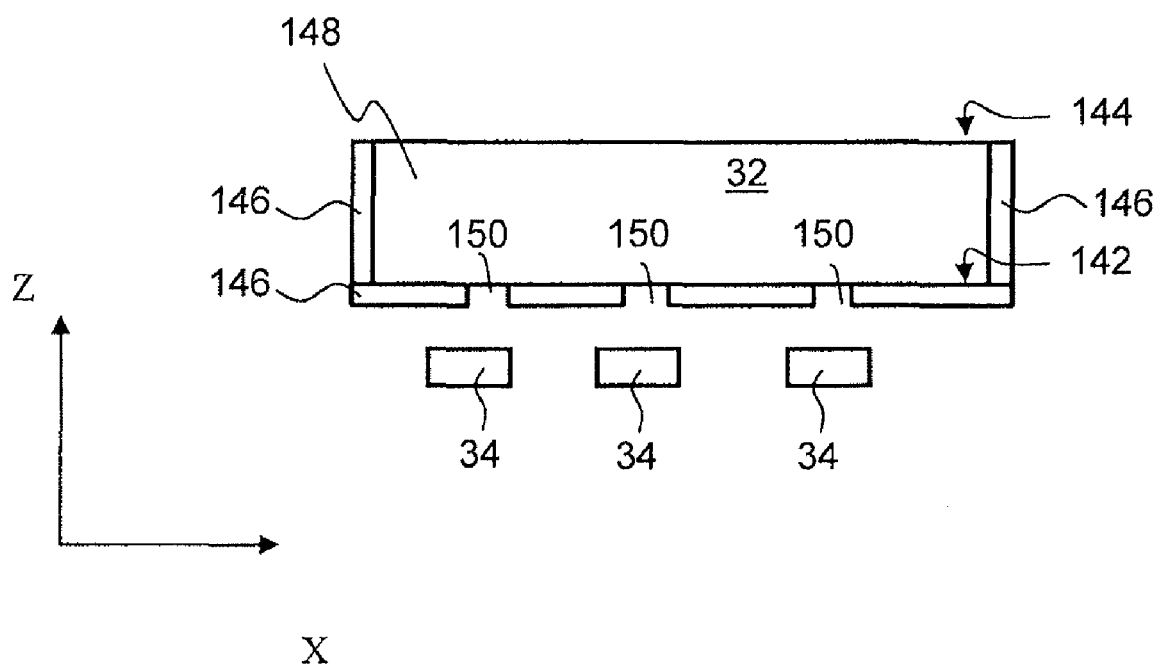
FIGS. 4a-4d are schematic illustrations showing cross-sectional views of an optical funnel, according to some embodiments of the present invention.

A cross-sectional view of an exemplary embodiment of optical funnel 32 is illustrated in FIG. 4*a*. Optical funnel 32 receives the light from one or more light-emitting elements 34 and distributes it prior to entry of the light into layer 12 (not shown in FIG. 4, see FIGS. 1*d* and 1*e*) so as to establish a plurality of entry locations within zone 30 (hence improving the uniformity of light distribution within zone 30). Light-emitting elements 34 may be arranged near funnel 32 or they may be embedded in funnel 32. Efficient optical transmission between funnel 32 and layer 12 is preferably ensured by impedance matching therebetween. Each light-emitting element 34 may be a discrete light source, e.g., an LED. In various embodiments, each light-emitting element 34 is a substantially unpackaged (or "bare") LED die. In such embodiments, funnel 32 or other portions of device 10 (such as zone 30, as described further below) function as the "package" for light-emitting element 34. In preferred embodiments of the invention, bare LED dies do not include a phosphor or other photoluminescent material as a portion thereof (e.g., on a common substrate therewith or incorporated into or onto the LED semiconductor layer structure). Where a single light-emitting element 34 is described herein, more than one light-emitting element 34 could generally also be utilized, and vice versa. Generally, light is emitted from light-emitting element 34 upon supply of electrical current thereto.

Funnel 32 may be made as a surface-emitting waveguide or surface-emitting optical cavity which receives the light generated by light-emitting elements 34 through an entry surface 142, distributes it within an internal volume 148, and emits it through an exit surface 144, which is typically opposite to the entry surface 142.

In some embodiments of the present invention, funnel 32 comprises one or more light reflectors 146, which are typically arranged peripherally about volume 148 so as to form an optical cavity or an optical resonator within volume 148. One or more light reflectors 146 may also be formed on or attached to the entry surface 142 of funnel 32. In this embodiment, one or more openings 150 are formed on the reflectors 146 at the entry surface, thus allowing light to enter volume 148. Openings 150 may be substantially aligned, e.g., in the x-y plane, with light-emitting elements 34.

Funnel 32 may include or consist essentially of a waveguide material, or it may be filled with a medium having a small absorption coefficient to the spectrum or spectra emitted by the light-emitting elements 34. For example, funnel 32 may be filled with air, or be made of a waveguide material which is similar or identical to the material of the cladding layers 12 and/or 14. The advantage of using air is its low absorption coefficient, and the advantage of a waveguide material identical to material of the cladding layers 12, 14 is impedance matching therewith.

When funnel 32 is filled with medium having a small absorption coefficient (e.g., air), there may be no impedance matching at exit surface 144 of funnel 32. Thus, some reflections and refraction events may occur upon the impingement of light on the interface between funnel 32 and the cladding layer 12. Neither refraction nor reflection events cause significant optical losses; refraction events contribute to the distribution of light within zone 30, and reflection events contribute to the distribution of light within volume 148.

Figure 4B:
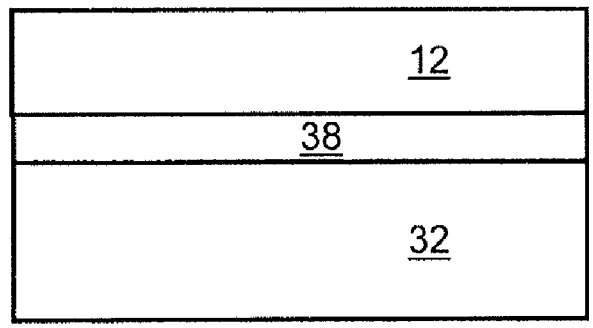
Figure 4C:
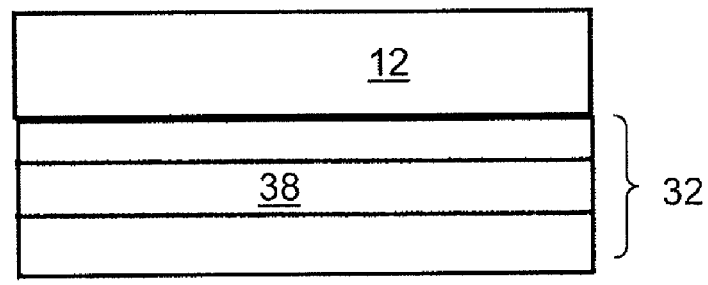
Figure 4D:
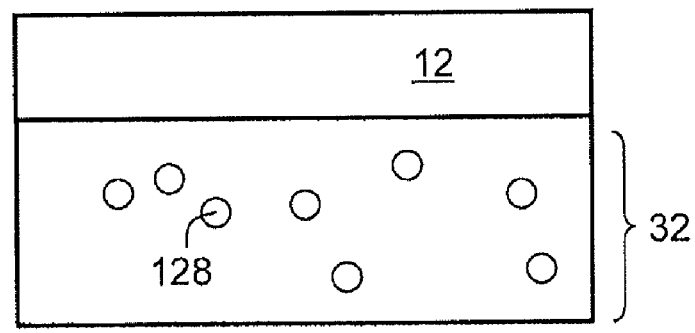

In various exemplary embodiments of the invention, funnel 32 is supplemented by photoluminescent material for controlling the output profile of the light, as schematically illustrated in FIGS. 4*b*-4*d*. For clarity of presentation, the reflectors 146 are not shown in FIGS. 4*b*-4*d*. In any of the embodiments, funnel 32 may include one or more light reflectors 146 as detailed above. In the embodiment illustrated in FIG. 4*b*, a photoluminescent layer 38 is interposed between layer 12 and funnel 32; in the embodiment illustrated in FIG. 4*c*, photoluminescent layer 38 is embedded in funnel 32; and in the embodiment illustrated in FIG. 4*d* a plurality of photoluminescent particles 128 is distributed within funnel 32.

Various embodiments of the present invention feature one or more light-emitting elements 34 embedded within zone 30 of device 10 and/or photoluminescent material (e.g., photoluminescent layer 38 and/or particles 128) disposed within device 10 outside of the direct "line-of-sight" from light-emitting elements 34. That is, in such embodiments, there is no direct, straight-line optical path between the light-emitting elements 34 and the photoluminescent material; rather, light emitted from light-emitting elements 34 reflects from a reflector, a surface, or an interface within device 10 before reaching the photoluminescent material. Thus, any light striking and being back-reflected from the photoluminescent material will not propagate directly back into light-emitting element 34 (where it could be absorbed, thus reducing overall light output and efficiency of device 10). Rather, light reflecting from the photoluminescent material will tend to remain within device 10 and eventually reflected back toward zone 28 to be out-coupled. In some embodiments, there is substantially no direct line-of-sight between light-emitting element 34 and the photoluminescent material, i.e., less than approximately 5% of the light from light-emitting element 34 has a direct line-of-sight to the photoluminescent material; any losses thereof are therefore negligible.

Whether or not the photoluminescent material is within a direct line-of-sight of light-emitting element 34, the photoluminescent material may advantageously be located remotely in relation to light-emitting element 34, i.e., it may be present in zone 26 and/or zone 28 rather than proximate light-emitting element 34 (in zone 30 or in funnel 32, for example). The quantum efficiency (or other performance metric) of the photoluminescent material may degrade when the material is exposed to elevated temperatures, e.g., temperatures greater than approximately 50° C. Remote placement of the photoluminescent material prevents the temperature of the material from rising during operation due to, e.g., heat given off by light-emitting element 34. Instead, the temperature of remotely placed luminescent material will generally remain at the ambient temperature of the surroundings of device 10. Generally, the temperature of the luminescent material may remain at least approximately 30° C., or even at least 100° C. less than the temperature of light-emitting element 34 during operation.

During assembly of device 10, elevated temperatures capable of damaging (e.g., degrading the quantum efficiency of) the photoluminescent material are often required when affixing or embedding light-emitting element 34 into device 10. Remote placement of the photoluminescent material enables the photoluminescent material to be provided within device 10 prior to the addition of light-emitting element 34—the distance therebetween prevents the elevated temperatures from damaging the photoluminescent material.

Figure 4E:
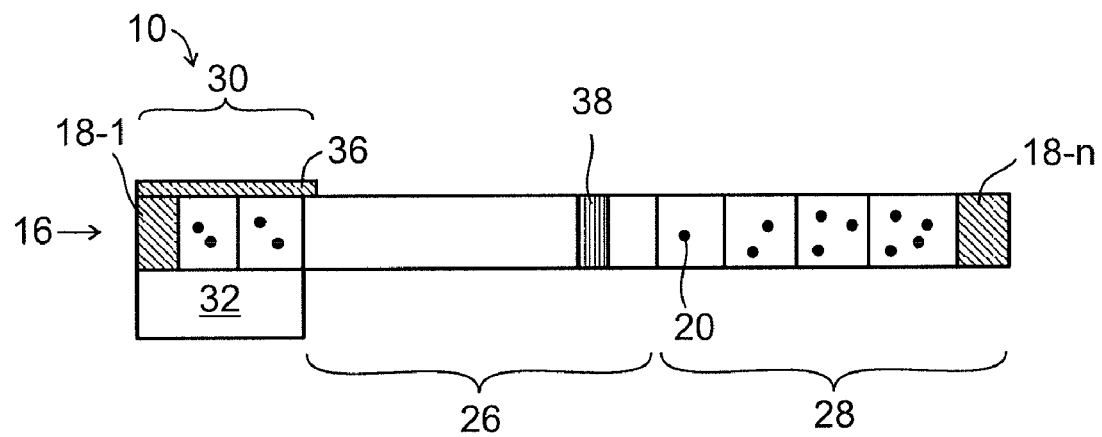
FIGS. 4e-4g are cross-sectional views of an optical waveguide device having substantially no line-of-sight between a photoluminescent material and a light-emitting element in an optical funnel, according to some embodiments of the present invention.

A remotely placed photoluminescent material may be located in any one or more of a variety of locations, as depicted in FIGS. 4e-4j. FIG. 4e depicts a photoluminescent layer 38 within zone 26 and outside the direct line-of-sight of light-emitting element(s) in funnel 32 (e.g., as illustrated in FIG. 4a). At least a portion of the light propagating through zone 26 is converted by photoluminescent layer 38 to light of a different wavelength, and then the converted and unconverted light components enter zone 28 where they are out-coupled together to form, e.g., substantially white light. In this and similar configurations, the propagating light converted by the photoluminescent material travels in a direction substantially perpendicular to the direction of the eventual out-coupled light. Such configurations may enable superior uniformity, brightness, and color of the out-coupled light.

Figure 4F:
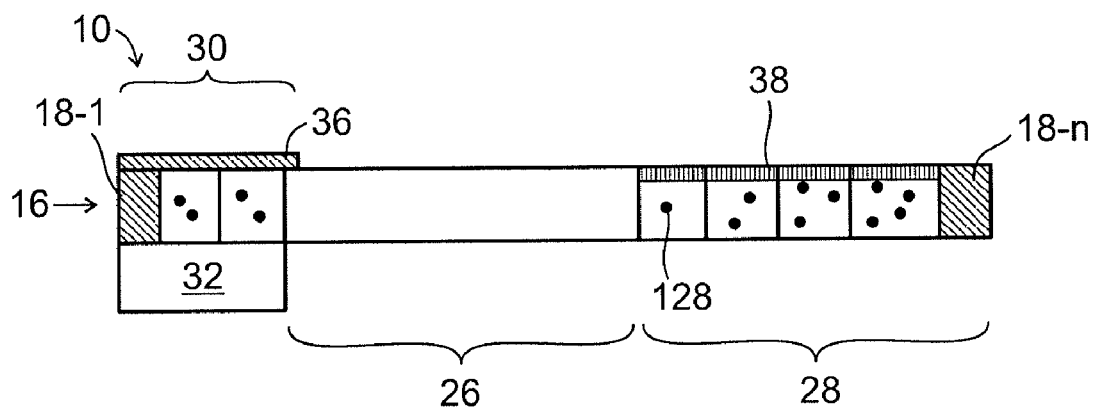

FIG. 4f depicts potential locations in zone 28 for the photoluminescent material, which are also outside the direct line-of-sight of light-emitting element(s) in funnel 32. First, photoluminescent particles 128 may be utilized in conjunction with (or instead of) particles 20; at least a portion of light striking particles 128 is converted to light of a different wavelength, and the light out-coupled from zone 28 is, e.g., substantially white. Additionally (or instead), photoluminescent layer 38 may be disposed within zone 28, e.g., proximate a top edge thereof. In this configuration, at least a portion of the light already being out-coupled (i.e., on its way out of device 10) is converted to light of a different wavelength. The exiting converted and unconverted light mix to form, e.g., substantially white light. In configurations featuring particles 20 (or other optical element(s)) disposed between light-emitting element 34 and a photoluminescent material (e.g., photoluminescent layer 38 disposed along the top edge of zone 28), the uniformity of the light striking the photoluminescent material may be greater than the uniformity of the light striking particles 20. That is, the scattering by particles 20 increases the uniformity of the light, which then strikes the photoluminescent material and is out-coupled from device 10 with a high level of uniformity. The line of sight between light-emitting element 34 and the photoluminescent material may not be eliminated by placement of particles 20 therebetween, as some light may propagate through the region populated with particles 20 without being scattered thereby.

Figure 4G:
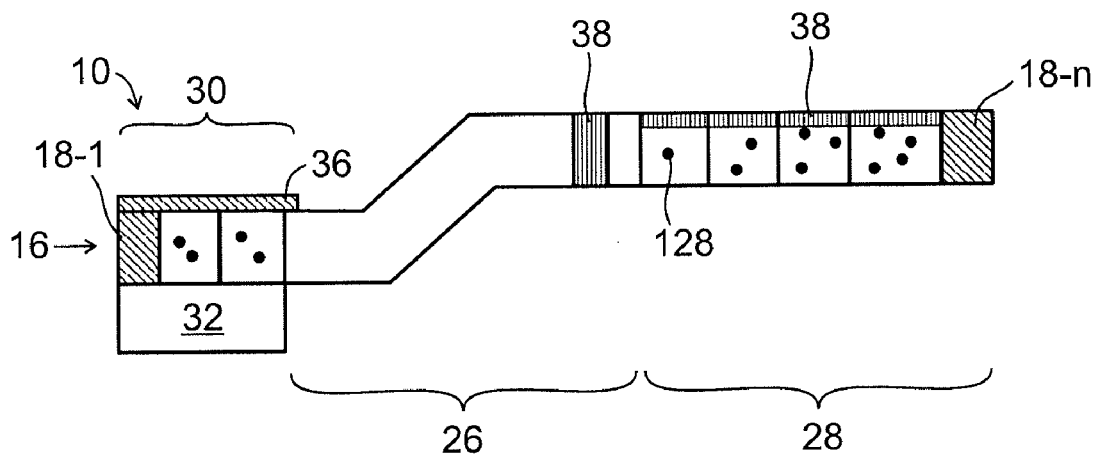

FIG. 4g depicts possible locations for a photoluminescent material described with reference to FIGS. 4e and 4f, any of which (or any combination of which) may be utilized in conjunction with a device 10 shaped to eliminate the direct line-of-sight between the light-emitting element(s) in funnel 32 and photoluminescent layer 38 and/or particles 128. As shown in FIG. 4g, device 10 may include a bend, curve, or other geometry in zone 26 (or even in zone 28) which facilitates the elimination of a direct line-of-sight between the light-emitting element(s) and the photoluminescent material. This geometry may also facilitate subsequent "tiling" of multiple devices 10 to form an illumination panel, e.g., a panel in which the zones 28 of devices 10 overlie zones 26 and/or 30 of adjacent devices 10 (as further described below with reference to FIGS. 12a and 12b). The shape depicted in FIG. 4g is exemplary, and many other configurations are possible.

Figure 4H:
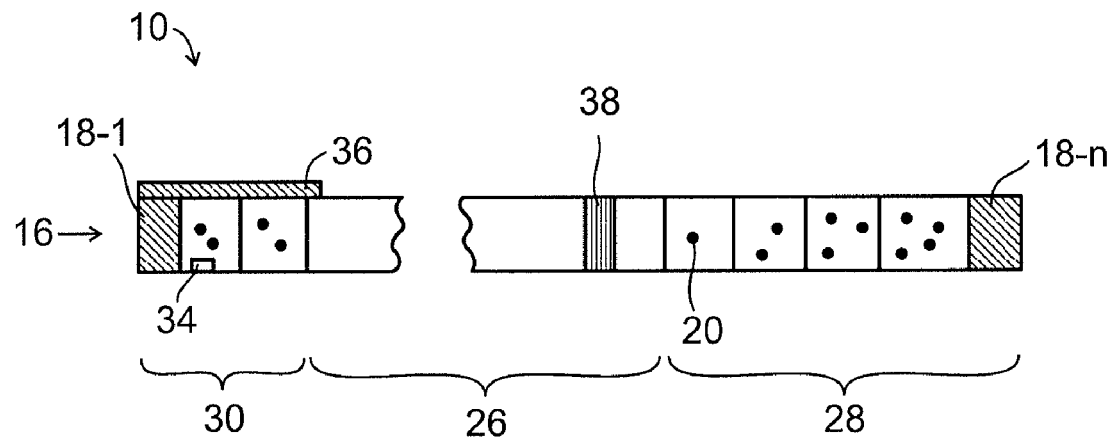
FIGS. 4h-4j are cross-sectional views of an optical waveguide device having substantially no line-of-sight between a photoluminescent material and a light-emitting element embedded within the waveguide device, according to some embodiments of the present invention.
Figure 4I:
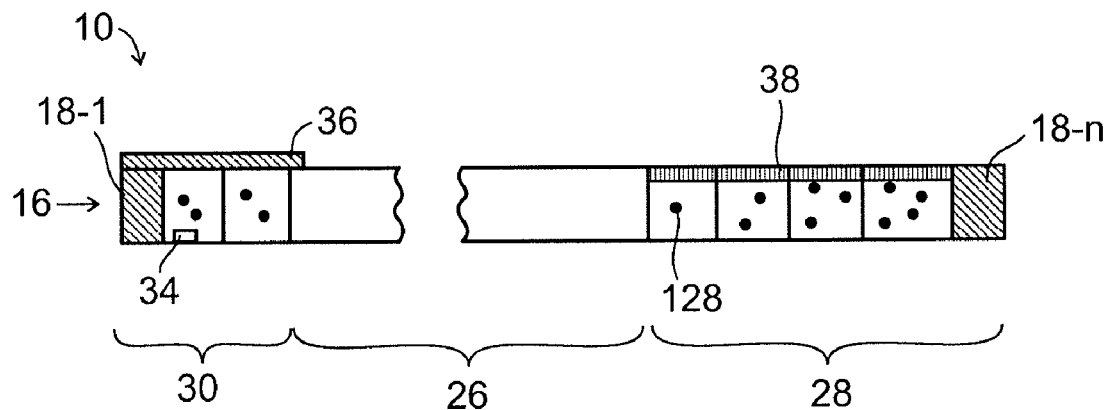
Figure 4J:
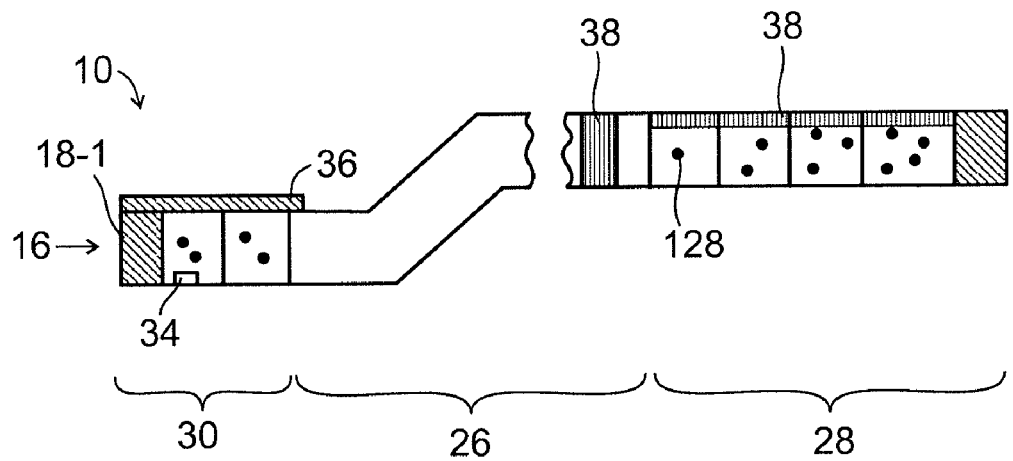

FIGS. 4h-4j are analogous to FIGS. 4e-4g, respectively, but depict one or more light-emitting elements 34 embedded within device 10 (here shown embedded within a core structure 18 of zone 30) rather than coupled to device 10 via funnel 32. As shown by the schematic break within zone 26 in FIGS. 4h-4j, zone 26 may be elongated and/or be sized and shaped so as to substantially or completely eliminate the direct line-of-sight between light-emitting element(s) 34 and photoluminescent layer 38 and/or particles 128. Each device 10 depicted in FIGS. 4e-4j may also incorporate cladding layers 12,14, e.g., as illustrated in FIGS. 1c-1e.

In a preferred embodiment, light from light-emitting element 34 (whether embedded within device 10 or operated in conjunction with funnel 32) generally enters zone 30 in an "in-coupling direction," i.e., along the z axis indicated in FIG. 1b. Once in-coupled into device 10 by scattering from particles 20 and/or reflector 36, the light generally propagates through device 10 (e.g., through zone 26) in a "propagation direction" that is substantially perpendicular to the in-coupling direction. As illustrated in FIG. 1b, the propagation direction is generally along the x axis. After the light enters zone 28, it is generally out-coupled from device 10 (i.e., emitted from surface 23 and/or 24) in an "out-coupling direction" that is substantially perpendicular to the propagation direction (e.g., along the z axis indicated in FIG. 1b). Thus, the in-coupling direction and the out-coupling direction may be substantially parallel. In some embodiments in which photoluminescent layer 38 and/or particles 128 are present, at least a portion of the light propagating in device 10 in the propagation direction is stimulated by photoluminescent layer 38 and/or particles 128, giving rise to the mixed light that is out-coupled from device 10 in an out-coupling direction substantially perpendicular to the propagation direction. This configuration may enable better brightness and/or color uniformity than devices in which stimulated light (i.e., light before or as it strikes a photoluminescent material) propagates in a direction that is not substantially perpendicular (e.g., a substantially parallel direction) to an out-coupling direction of the mixed light resulting from stimulation by the photoluminescent material.

Phosphors are widely used for coating individual LEDs, typically to obtain white light therefrom. However, photoluminescent layers incorporated in waveguide devices as described herein have not been employed. The advantage of providing photoluminescent layer 38 and/or particles 128 (in layer 16 and/or funnel 32) as opposed to on each individual light-emitting element, is that waveguide device 10 diffuses the light before emitting it. Thus, instead of collecting light from a point light source (e.g., a LED), photoluminescent layer 38 and/or particles 128 collects light having a predetermined extent. This configuration allows a better control on the light profile provided by device 10.

Many types of phosphorescent and fluorescent substance are contemplated. Representative examples include, without limitation, the phosphors disclosed in U.S. Pat. Nos. 5,813,752, 5,813,753, 5,847,507, 5,959,316, 6,155,699, 6,351,069, 6,501,100, 6,501,102, 6,522,065, 6,614,179, 6,621,211, 6,635,363, 6,635,987, 6,680,004, 6,765,237, 6,853,131, 6,890,234, 6,917,057, 6,939,481, 6,982,522, 7,015,510, 7,026,756, 7,045,826, and 7,005,086, the entire disclosures of which are hereby incorporated by reference. In an embodiment, the quantum efficiency of photoluminescent layer 38 and/or particles 128 is only stable up to a temperature of approximately 50° C. However, in many configurations the temperature of such materials remains lower than this level due to spatial separation of photoluminescent layer 38 and/or particles 128 from the light-emitting element(s). In various embodiments, layer 38 and/or particles 128 include or consist essentially of one or more electroluminescent materials rather than (or in addition to) photoluminescent materials. Such electroluminescent materials may include or consist essentially of quantum dot materials and/or organic LED (OLED) materials. Suitable quantum dots may include or consist essentially of cadmium selenide.

There is more than one configuration in which photoluminescent layer 38 may be used. In one embodiment, photoluminescent layer 38 complements the light emitted by light-emitting elements 34 to create a white light, e.g., using dichromatic, trichromatic, tetrachromatic or multichromatic approach. For example, a blue-yellow dichromatic approach may be employed, in which case blue light-emitting elements (e.g., InGaN LEDs with a peak emission wavelength at about 460 nm) are used, and photoluminescent layer 38 may include or consist essentially of phosphor molecules with an absorption spectrum in the blue range and an emission spectrum extending to the yellow range (e.g., cerium-activated yttrium aluminum garnet, or strontium silicate europium). Since the scattering angle of light sharply depends on the frequency of the light (fourth-power dependence for Rayleigh scattering, or second-power dependence for Mie scattering), the blue light generated by the blue light-emitting elements 34 is efficiently diffused in the waveguide material before interacting with photoluminescent layer 38 and/or particles 128. Layer 38 and/or particles 128 emit light in its emission spectrum and complement the blue light which is not absorbed by photoluminescent layer 38 and/or particles 128 to white light.

In another dichromatic configuration, ultraviolet light-emitting elements (e.g., LEDs of GaN, AlGaN, and/or InGaN with a peak emission wavelength between 360 nm and 420 nm) are used. Light of such ultraviolet light-emitting elements is efficiently diffused in the waveguide material. To provide substantially white light, two photoluminescent layers 38 and/or two types of photoluminescent particles 128 are preferably employed. One such photoluminescent layer and/or type of particles may be characterized by an absorption spectrum in the ultraviolet range and emission spectrum in the orange range (with peak emission wavelength from about 570 nm to about 620 nm), and another photoluminescent layer and/or type of particles may be characterized by an absorption spectrum in the ultraviolet range and emission spectrum in the blue-green range (with peak emission wavelength from about 480 nm to about 500 nm). The orange light and blue-green light emitted by the two photoluminescent layers 38 and/or two types of photoluminescent particles 128 blend to appear as white light to an observer. Since the light emitted by the ultraviolet light-emitting elements is above or close to the end of the visual range, it is not discerned by the observer. When two photoluminescent layers 38 are employed, they may be deposited one on top of the other so as to improve the uniformity. Alternatively, a single photoluminescent layer 38 having two types of photoluminescent material with the above emission spectra may be utilized.

In another embodiment a trichromatic approach is employed. For example, blue light-emitting elements may be employed as described above, with two photoluminescent layers 38 and/or two types of photoluminescent particles 128. A first photoluminescent layer 38 and/or type of photoluminescent particles 128 may include or consist essentially of phosphor molecules with an absorption spectrum in the blue range and an emission spectrum extending to the yellow range as described above, and a second photoluminescent layer 38 and/or type of photoluminescent particles 128 may include or consist essentially of phosphor molecules with an absorption spectrum in the blue range and an emission spectrum extending to the red range (e.g., cerium-activated yttrium aluminum garnet doped with a trivalent ion of praseodymium, or europium-activated strontium sulphide). The unabsorbed blue light, the yellow light, and the red light blend to appear as white light to an observer.

Also contemplated is a configuration is which light-emitting elements 34 with different emission spectra are employed and several photoluminescent layers 38 are deposited and/or several types of photoluminescent particles 128 are distributed, such that the absorption spectrum of each photoluminescent layer 38 and/or type of photoluminescent particles 128 overlaps one of the emission spectra of the light-emitting elements 34, and all the emitted colors (of the light-emitting elements 34 and the photoluminescent layers 38 and/or particles 128) blend to appear as white light. The advantage of such a multi-chromatic configuration is that it provides a high-quality white balance because it allows better control of the various spectral components of the light in a localized manner, e.g., along an edge or surface of device 10.

The color composite of the white output light depends on the intensities and spectral distributions of the emanating light emissions. These depend on the spectral characteristics and spatial distribution of the light-emitting elements 34, and, in the embodiments in which one or more photoluminescent components (layers 38 and/or particles 128) are employed, on the spectral characteristics of the photoluminescent components and on the amount of unabsorbed light. The amount of light unabsorbed by the photoluminescent components is, in turn, a function of the characteristics of the components, e.g., thickness of the photoluminescent layer(s) 38, density of photoluminescent material(s), and the like. By judiciously selecting the emission spectra of light-emitting element 34 and optionally the thickness, density, and spectral characteristics (absorption and emission spectra) of photoluminescent layer 38 and/or particles 128, device 10 may provide substantially uniform white light.

In any of the above embodiments, the "whiteness" of the light may be tailored according to the specific application for which device 10 is intended. For example, when device 10 is incorporated as backlight of an LCD device, the spectral components of the light provided by device 10 may be selected in accordance with the spectral characteristics of the color filters of the liquid crystal panel. In other words, since a typical liquid crystal panel includes an arrangement of color filters operating at a plurality of distinct colors, the white light provided by device 10 includes at least at the distinct colors of such filters. This configuration significantly improves the optical efficiency as well as the image quality provided by the LCD device, because the optical losses due to mismatch between the spectral components of the backlight unit and the color filters of the liquid crystal panel are reduced or eliminated.

Thus, in the embodiment in which the white light is achieved by light-emitting elements 34 emitting different colors of light (e.g., red light, green light and blue light), the emission spectra of the light-emitting elements 34 are preferably selected to substantially overlap the characteristic spectra of the color filters of an LCD panel. In the embodiment in which device 10 is supplemented by one or more photoluminescent components (layers 38 and/or particles 128), the emission spectra of the photoluminescent components and optionally the emission spectrum (or spectra) of the light-emitting elements are preferably selected to overlap the characteristic spectra of the color filters of an LCD panel. Typically, the overlap between a characteristic emission spectrum and a characteristic filter spectrum is about 70% spectral overlap, more preferably about 80% spectral overlap, and even more preferably about 90%.

The following is a description of a production process for the core layer 16 and the optical waveguide device 10 according to various exemplary embodiments of the present invention.

In some embodiments, the core layer is formed by coextrusion. As used herein, the term "coextrusion" refers to the process of simultaneous extrusion of several die outputs which are welded together before chilling to form an extrudate having an open shape, e.g., a non-tubular sheet. An extrudate formed by a coextrusion process according to some embodiments of the present invention may be a single-layer structure or a laminate structure having two or more layers. In some embodiments of the present invention the coextrusion process is employed in an extrusion coating process in which an extrudate formed by the coextrusion process is applied so as to coat one or more existing layers.

Thus, a plurality of light-transmissive compositions in a molten or plastic state may be coextruded to form the elongated core structures of core layer 16. Each light-transmissive composition may be extruded to form a single core structure 18, and may be a polymeric material mixed with light-scattering particles of type, size and concentration selected to provide the core structure 18 with the desired optical properties (e.g., mean free path).

Figure 5:
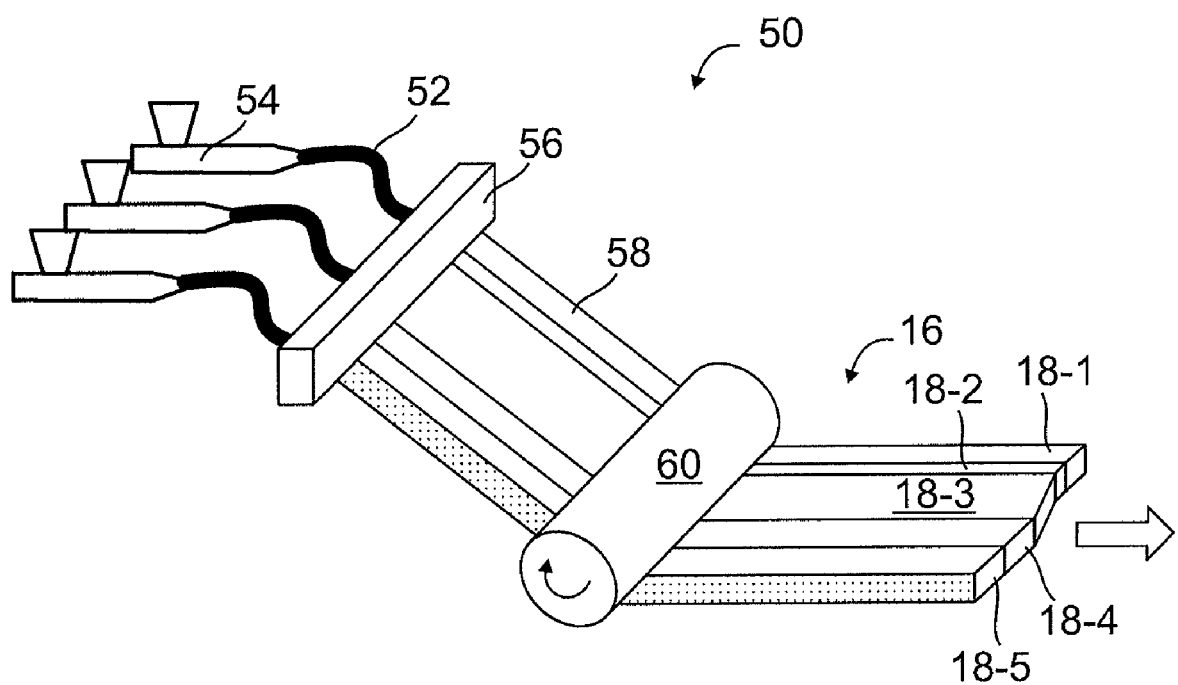
FIG. 5 is a schematic illustration of a coextrusion apparatus for forming a core layer, according to some embodiments of the present invention.

A coextrusion apparatus 50 which may be used according to some embodiments of the present invention is schematically illustrated in FIG. 5. As shown therein, several melt or plasticized streams 52 (three in the illustration) are individually extruded from a plurality of extruders 54. The melt streams comprise light-transmissive compositions in accordance with the respective core structures 18 to be formed. Extruders 54 discharge the compositions, which are conveyed by conventional conduits (not shown) to a coextrusion die or feedblock 56. Die 56 combines and arranges the compositions and issues a composite flat stream 58 in which the various compositions flow side-by-side. A chill roller system 60 quenches stream 58 to form core layer 16 which includes or consists essentially of a plurality of core structures 18 as described above. The formed core structures 18 may have any shape or cross-section, e.g., rectangular or triangular.

One or more of the extruded core structures 18 (e.g., the sidemost elongated structure 18-1 and 18-n, see FIG. 1a) may be made reflective. This may be achieved by judicious selection of the composition from which these core structures are formed. For example, a composition characterized by high refractive index (e.g., 2 or more) may be fed to the respective extruder 54. A representative example of a material having a sufficiently high refractive index for reflectivity is $TiO_2$, which has a refractive index of about 2.5. Also contemplated, is the use or incorporation of a substantially opaque composition or the incorporation of reflective particles at a sufficiently high density to make core structure 18 reflective.

Figure 6:
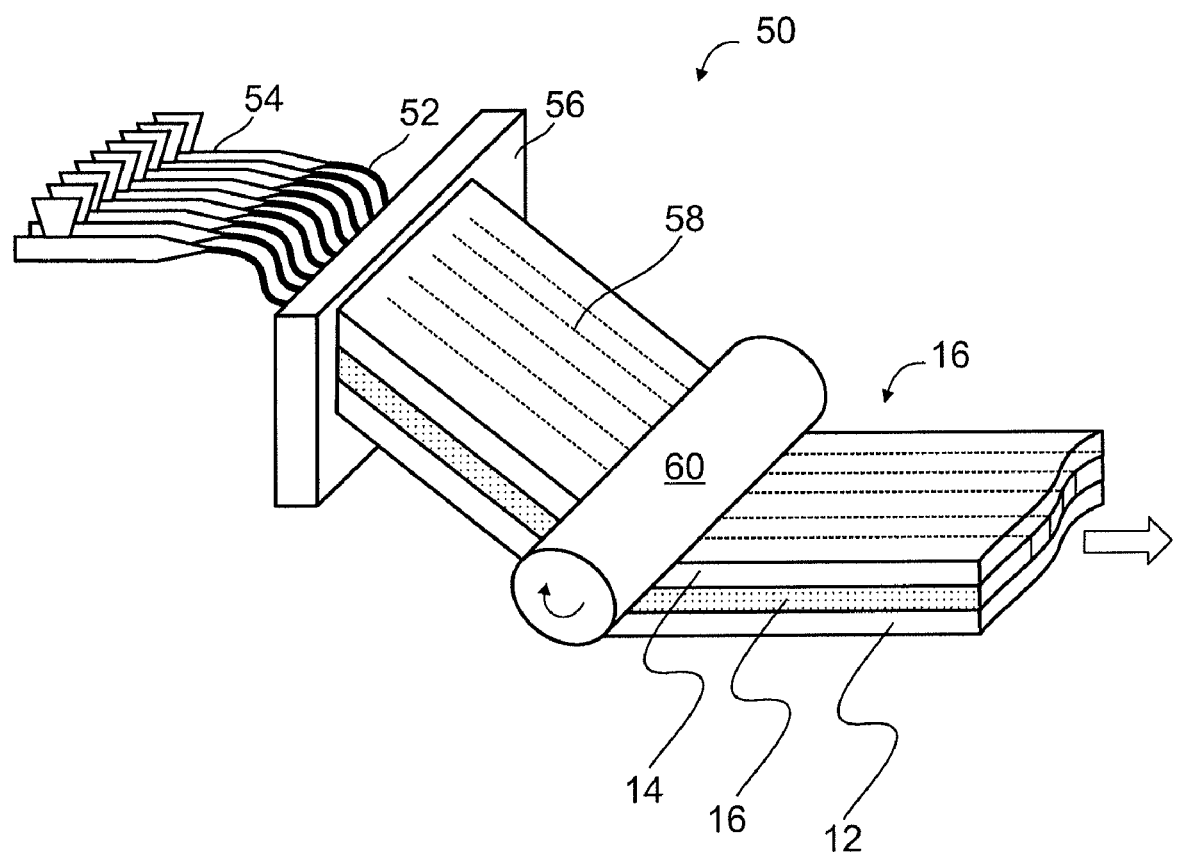
FIG. 6 is a schematic illustration of a coextrusion apparatus for forming a core layer and one or more cladding layers, according to some embodiments of the present invention.

Coextrusion apparatus 50 may be adapted to simultaneously form the core layer 16 as well as the cladding layers 12, 14. This approach is illustrated in FIG. 6, which shows apparatus 50 with a die 56 configured to combine and arrange the compositions into a laminated flat stream 58 in which the intermediate layer of stream 58 is composed of side-by-side flow of the various compositions of the core layer 16 and the outer layers of the stream are composed of the compositions of the cladding layers 12, 14. In an embodiment, additional layers are formed above and below the cladding layers 12, 14, e.g., for the purpose of protecting or reenforcing the cladding layers 12, 14.

Figure 7A:
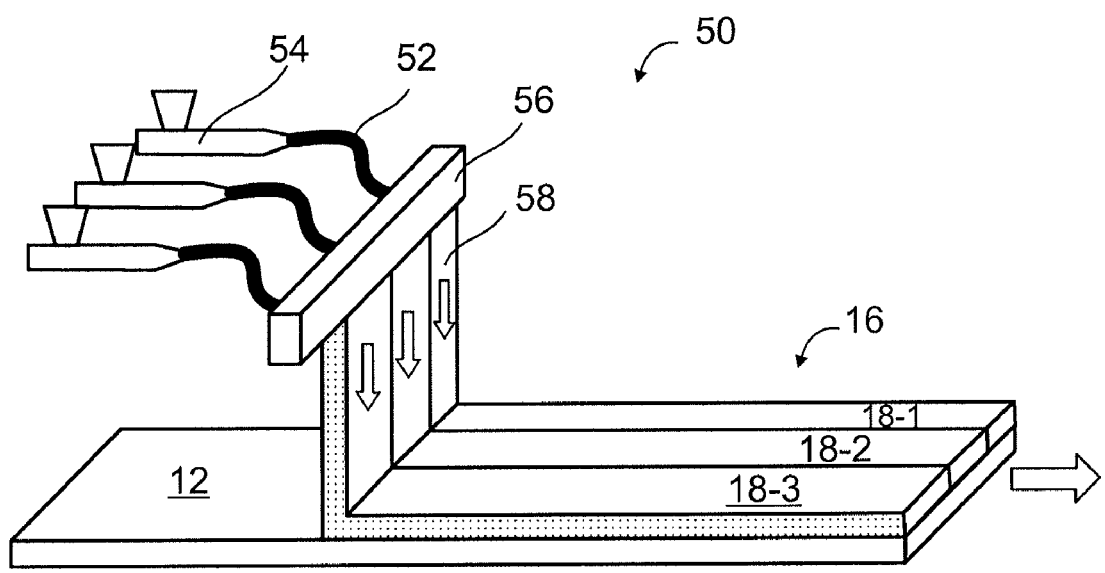
FIGS. 7a and 7b are schematic illustrations of a process for forming a core layer and optionally one or more cladding layers using extrusion coating technique, according to various exemplary embodiments of the present invention.
Figure 7B:
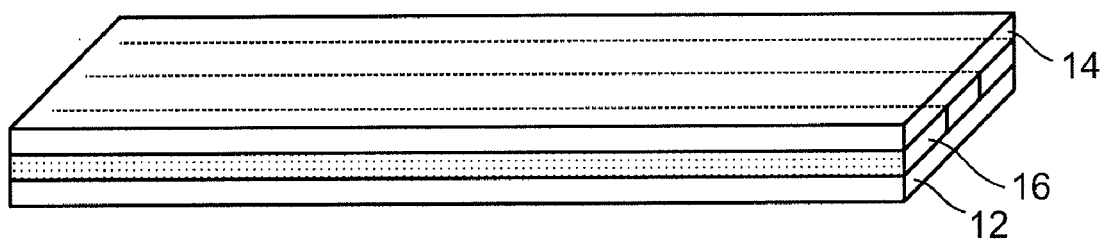

An alternative embodiment is illustrated in FIGS. 7a and 7b. In this embodiment, apparatus 50 performs an extrusion coating process, whereby the core structures 18 of core layer 16 are coextruded on a cladding layer 12 which is already in a dimensionally stable (i.e., rigid) state. Once core layer 16 is dimensionally stable (e.g., following cooling, or treatment with roller system 60), cladding layer 14 may optionally be laminated on core layer 16 to form a three-layer structure.

Once the core layer 16 and optionally the cladding layers 12, 14 are coextruded, the layer(s) may be further treated while the compositions are in molten or plastic state. One example of such treatment is application of heat and/or pressure so as to at least partially mix respective compositions at common edges of adjacent core structures 18. When the adjacent core structures 18 have different particle concentrations (including the case of two adjacent structures in which one has a zero concentration and the other has a non-zero concentration), the heat and/or pressure treatment may result in a concentration gradient across the lateral direction of the core structures 18. This embodiment is particularly useful when it is desired to have a smooth profile along the optical mean free path. Post-extrusion treatment of the formed core structures 18 may be performed by roller system 60 (prior to the cooling of the extruded structures), or it may be done using another roller system. When the compositions comprise thermoplastic materials, the post-extrusion treatment may be performed after the structures are cooled. In this embodiment, the post-extrusion treatment may include reheating of the core structures.

The optical waveguide device featured in embodiments of the present invention may also be manufactured by a lamination process. Suitable lamination processes may be employed on both thermoset and thermoplastic materials. Any lamination technique suitable for the materials from which core layer 16 and cladding layers 12, 14 are formed may be employed. The lamination process may be executed with or without a solid support. When a solid support (e.g., a metal support or other rigid support) is employed, it is preferably designed and constructed to allow lamination of individual core structures 18 in a side-by-side fashion. Thus, the solid support preferably fixes each individual core structure 18 to its place sidewise with a previously laminated elongated structure.

Figure 8A:
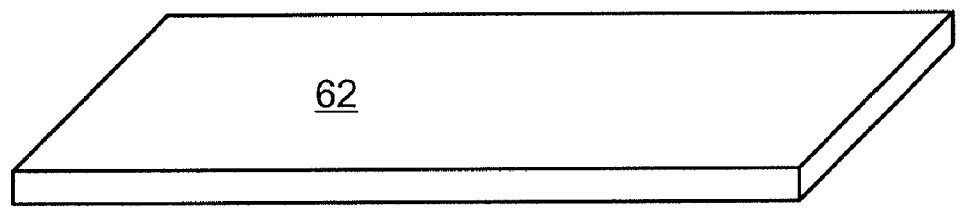
FIGS. 8a-8c are schematic illustrations of a process for forming a core layer and optionally one or more cladding layers using lamination technique, according to various exemplary embodiments of the present invention.
Figure 8B:
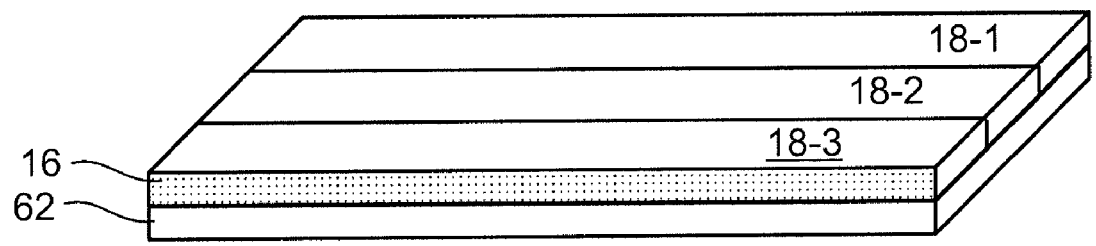
Figure 8C:
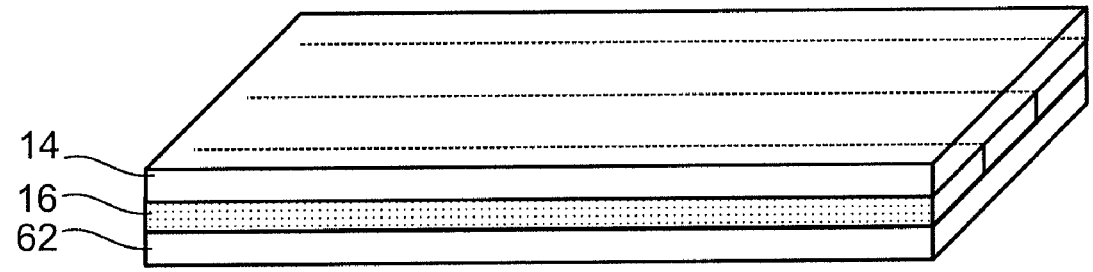

A lamination technique according to various embodiments is schematically illustrated in FIGS. 8a-8c. The process starts with a substrate 62 (FIG. 8a), on which the lamination process is executed. The process continues with the lamination of a plurality of core structures 18 (e.g., elongated core structures) in a side-by-side configuration on a substrate 62 to form core layer 16 (FIG. 8b). The lamination may be performed by heat-and-press, with or without adhesives. Optionally, but not obligatorily, substrate 62 may serve as a cladding layer (e.g., layer 12 of FIGS. 1c-1e or 1g). In this embodiment, substrate 62 preferably includes or consists essentially of a flexible cladding material and is preferably laid on a support substrate (not shown), which is desirably planar.

One or more light-reflective structures may be laminated sidewise relative to core layer 16. This may be done in a similar manner to the lamination of the other core structures 18.

Once laminated side-by-side, the core structures 18 may be joined at their common ends using any technique known in the art, including, without limitation, adhesive bonding, solvent bonding, or welding (also known as fusion bonding). The lamination of core 16 on substrate 62 may be preceded by a step in which an adhesive optical material is applied on substrate 62. If desired, substrate 62 may be removed following the lamination of the core structures 18. It this embodiment, the air serves as the "cladding" layer as detailed above.

In various exemplary embodiments of the invention the process continues by laminating cladding layer 14 on core layer 16 (FIG. 8c). Optionally, an optical adhesive may be applied on core layer 16 prior to the lamination of cladding layer 14 thereon.

Figure 9A:
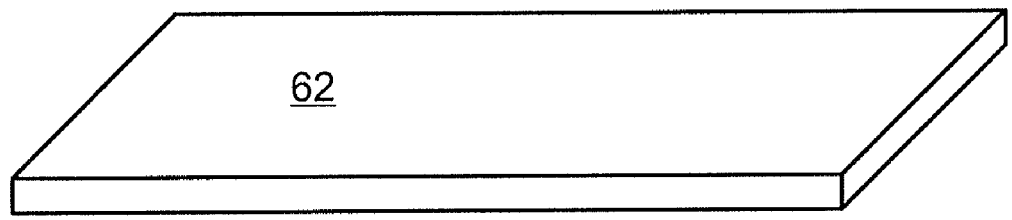
FIGS. 9a-9c are schematic illustrations of a process for forming a core layer and optionally one or more cladding layers using tiling technique, according to various exemplary embodiments of the present invention.
Figure 9B:
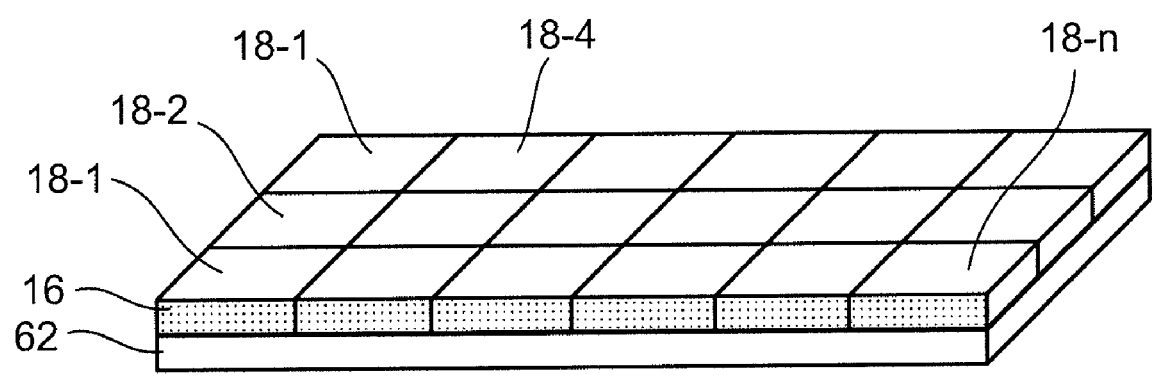
Figure 9C:
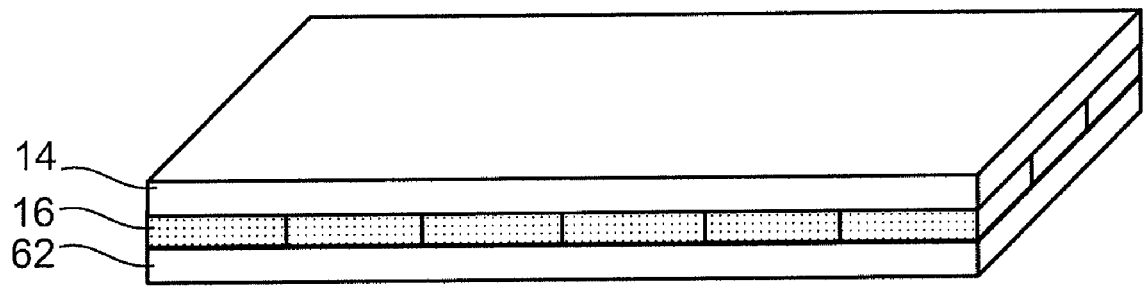

An additional technique for fabricating device 10 is illustrated in FIGS. 9a-9c. The process starts with substrate 62 (FIG. 9a). A plurality of core structures 18 having the shape of plaques are tiled in a side-by-side configuration on a substrate 62 to form core layer 16 (FIG. 9b). The tiling may be performed by lamination techniques such as heat-and-press, with or without adhesives. Optionally, but not obligatorily, substrate 62 may serve as a cladding layer (e.g., layer 12 of FIGS. 1c-e or 1g). In this embodiment, substrate 62 is made of a flexible cladding material and is preferably laid on a support substrate (not shown), which is preferably planar.

One or more light-reflective structures may be laminated sidewise relative to core layer 16. This may be done in a similar manner to the lamination of the other core structures 18.

Once laminated side-by-side, the core structures 18 may be joined at their common ends using any technique known in the art, including, without limitation, adhesive bonding, solvent bonding, or welding. The lamination of core 16 on substrate 62 may be preceded by a step in which an adhesive optical material is applied on substrate 62. If desired, substrate 62 may be removed following the lamination of the core structures 18. In this embodiment, the air serves as the "cladding" layer as detailed above. In various exemplary embodiments of the invention the process continues by laminating cladding layer 14 on core layer 16 (FIG. 9c). Optionally, an optical adhesive may be applied on core layer 16 prior to the lamination of cladding layer 14 thereon.

Following the lamination process of any of the above embodiments, one or more additional layers (not shown) may be attached to cladding layers 12 and/or 14. This may be achieved using any procedure known in the art, including, without limitation, printing, embossing, lamination, and the like. The attachment of the additional layers may be performed using any technique, including, without limitation, adhesive bonding, solvent bonding, welding, mechanical fastening, co-consolidation, and the like. The additional layer may cover the entire surface area of the cladding or a portion thereof. For example, a reflective foil 36 (see, e.g., FIG. 1a) may be attached to cladding layer 14. Also contemplated are jacket layers for protecting the cladding layers 12, 14.

Figure 10A:
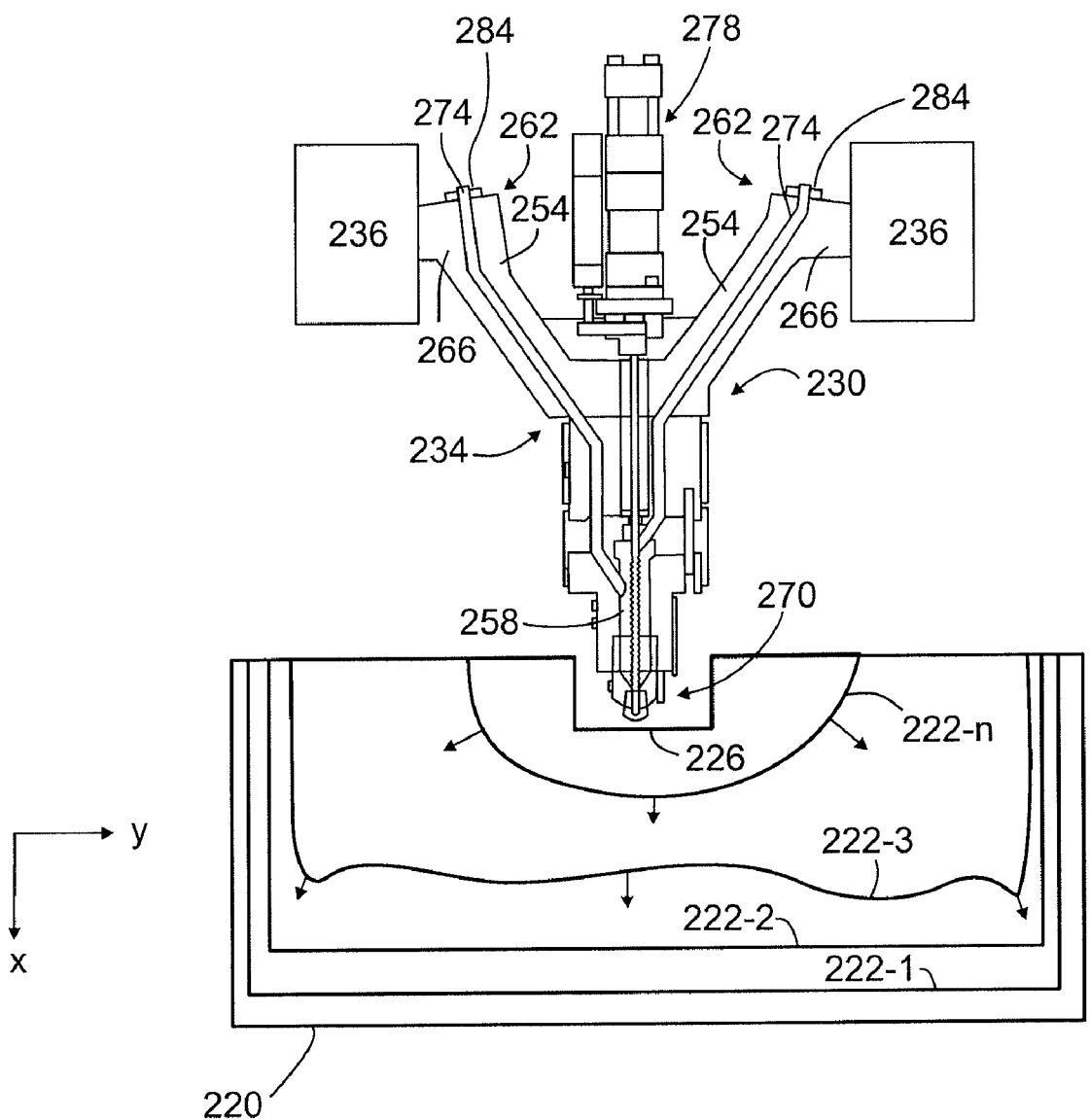
FIGS. 10a-10c are schematic illustrations of a process for manufacturing a core layer by co-injection technique, according to various exemplary embodiments of the present invention.
Figure 10B:
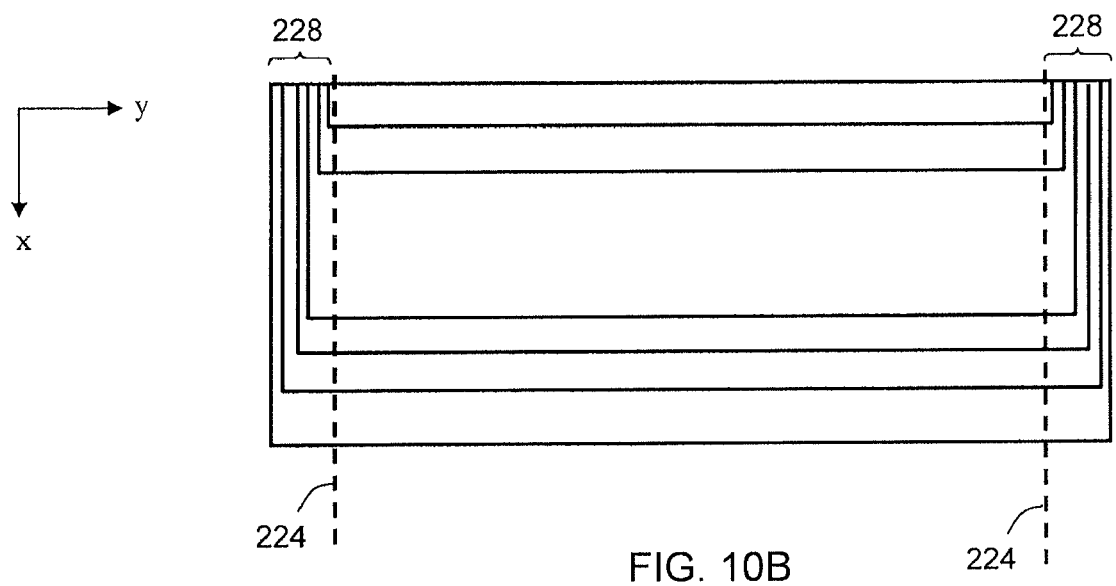
Figure 10C:
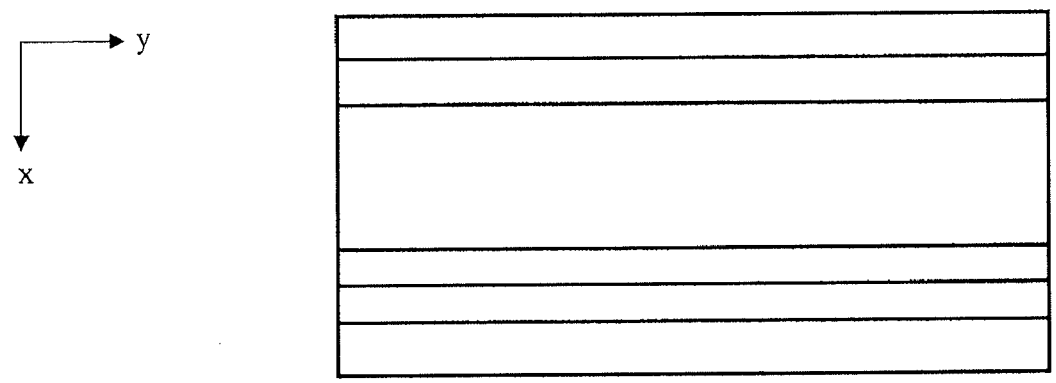

An additional technique for fabricating device 10 according to some embodiments of the present invention is illustrated in FIGS. 10a-10c. In these embodiments co-injection molding is employed. Co-injection molding is a variant of a process known as injection molding. In injection molding thermoplastic polymers or the like are fed from a hopper into a barrel, melted by a reciprocating screw and/or electric heat, and are propelled forward by a ram (piston, plunger) or the screw (used as a plunger) into a mold cavity, which is cooled to below the heat-distortion temperature of the resin.

Co-injection molding takes advantage of a characteristic of injection molding called fountain flow. As the cavity is filled, the material at the melt front moves from the center line of the stream to the cavity walls. The walls are typically kept below the transition temperature of the melt such that the material that touches the walls cools rapidly and freezes in place. This provides insulating layers through which new melt makes its way to the melt front.

In some embodiments of the present invention, the co-injection technique is employed for forming a core layer 16 having a plurality of core structures 18 in a nested configuration. A co-injection molding system suitable for the present embodiments is illustrated in FIG. 10a. The system typically includes a co-injection manifold 230 mounted relative to a mold cavity 220, and shaped according to the desired shape of the device. In various exemplary embodiments of the invention, mold cavity 220 has a substantially planar shape.

Manifold 230 includes a nozzle housing 234 having forward and rearward ends. The illustrated nozzle housing 234 is generally V-shaped, but any other shape suitable for co-injection may be utilized. Nozzle housing 234 includes a plurality of arms 254, each having a rearward end 262, and includes an outwardly extending mounting portion 266. Arms 254 are supported by mounting columns 236, which are typically fixedly mounted on a horizontal surface of a machine base sled (not shown).

Housing 234 has an outlet 270 in its forward end, as well as a plurality of inlets 274 in the rearward end of each arm. Outlet 270 communicates with an inlet 226 of cavity 220. Inlets 274 of housing 234 respectively communicate with a plurality of injection nozzles 284 of respective injection units (not shown). Each injection nozzle is typically fed by a different light-transmissive composition as described above.

Manifold 230 also includes a valve 258 movable between a plurality of positions. In each position, valve 258 open a fluid communication channel between one of inlets 274 and outlet 270. Also contemplated is a position in which valve 258 closes all communication channels. Valve 258 may be moved relative to housing 234 by a hydraulic cylinder 278 mounted on the manifold 230.

The co-injection system may operate as follows. The nozzle housing is oriented such that each injection nozzle provides one type of light-transmissive composition. The co-injection process begins with the valve 258 in a position selected such that a first light-transmissive composition (e.g., a composition with low concentration of light-scattering particles), in a molten or plastic state, flows through the outlet 270. The selected composition is injected into the mold cavity 220. The valve 258 is then moved to another position to allow flow of a second light-transmissive composition (e.g., a composition with a higher concentration of light-scattering particles), in a molten or plastic state, through the outlet 270. By the effect of fountain flow described above, the second composition is nested into the first composition. The process is optionally continued by repositioning the valve 258 so as to inject into the mold a third composition in a molten or plastic state. The third composition is nested into the previously injected second composition. The third composition may have a concentration of light-scattering particles higher than that of the second composition.

Any number of light-transmissive compositions may be serially injected into the mold so as to form a core layer 16 with a plurality of core structures 18 (which may be flexible) joined in a nested configuration. The melt fronts of the different light-transmissive compositions are designated in FIG. 10a by reference numerals 222-1, . . . , 222-n. The propagation of each melt front nesting into previously injected light-transmissive compositions is shown by arrows. An advantage of using a co-injection manifold for manufacturing the core layer 16 is that it allows more flexibility in selecting the characteristics of the different core structures 18. A continuous or semi-continuous control on the operation of the co-injection manifold may facilitate formation of core structures 18 in a manner such that the characteristic mean free path varies substantially smoothly from one core structure 18 to the other. Since the effective refractive index varies with the characteristic mean free path, various embodiments of the present invention allow production of an optical waveguide device 10 having a graded effective refractive index along the lateral direction.

Once the core layer 16 is formed, it is typically released from the mold. A top view of the core layer 16 once released from the mold is illustrated in FIG. 10b. The procedure optionally and preferably continues by cutting the core layer 16 along the lateral direction so as to remove one or more marginal regions 228 therefrom, thereby providing a core layer 16 in which the core structures 18 are joined in a side-by-side configuration. Shown in FIG. 10b are two cut lines 224 parallel to the lateral direction along which the core layer may be cut. A top view of the core layer 16 once cut along cut lines 224 is illustrated in FIG. 10c. The procedure may continue to form additional layers such as cladding layers 12, 14, and/or photoluminescent layers 38 on the core structure 16 as detailed above. In some embodiments of the present invention, the co-injection system is configured to inject also the cladding layers 12, 14.

Figure 11:
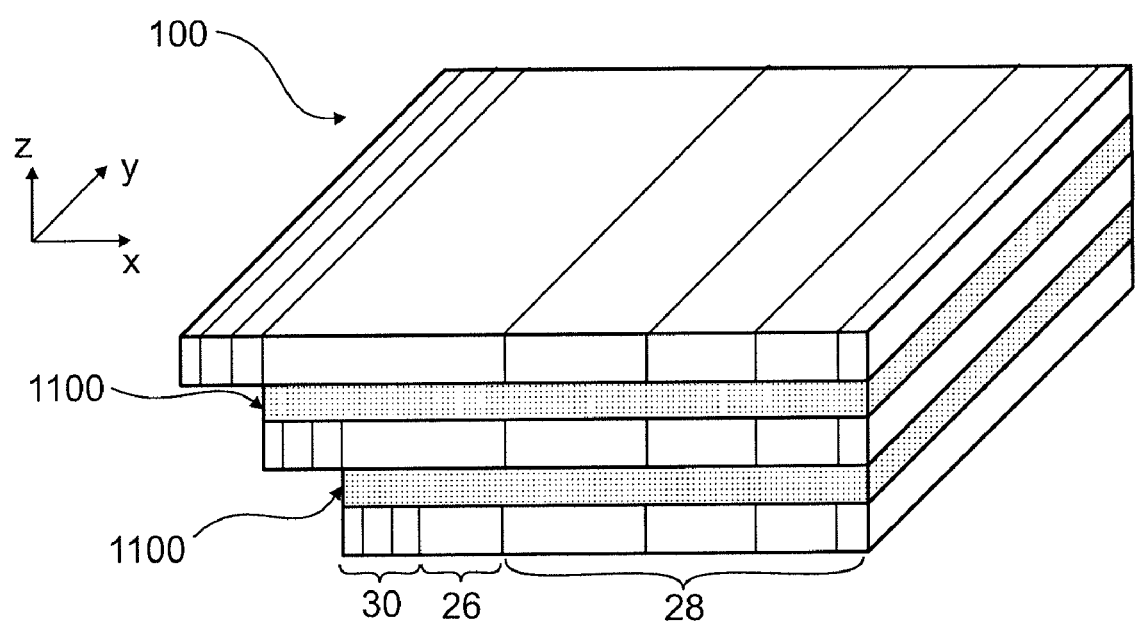
FIG. 11 is a schematic illustration showing a perspective view of a multilayer optical waveguide device, according to some embodiments of the present invention.

Referring to FIG. 11, in various embodiments of the invention, multilayer optical waveguide device 100 comprises multiple waveguide devices 10, each of which may be fabricated as described above. The devices 10 in multilayer device 100 may be disposed in a vertically "stacked" configuration as depicted in FIG. 11. A layer 1100 of low-refractive-index material may be disposed between each "layer" 10 in order to prevent undesired light propagation from one layer 10 to another. Light may be coupled in to zone 30 of each layer 10 from a different light source, or the same light source may be utilized for each layer 10. In a particular embodiment, multilayer device 100 provides controllable RGB illumination by including different types of photoluminescent particles 128 in each layer 10. For example, a bottom layer 10 may include photoluminescent particles 128 that emit red light, a middle layer 10 may include photoluminescent particles 128 that emit green light, and a top layer 10 may include photoluminescent particles 128 that emit blue light. Such a multicolor multilayer device 100 may be suitable for LCD backlight applications. As shown in FIG. 11, the zones 28 of the layers 10 may be substantially vertically aligned such that light emitted from the bottom layer 10 travels through the other layers 10 before finally being emitted from multilayer device 100. In other words, each zone 28 in multilayer device 100 may have substantially no vertical overlap with zones 26, 30 of the other layers 10.

Figure 12A:
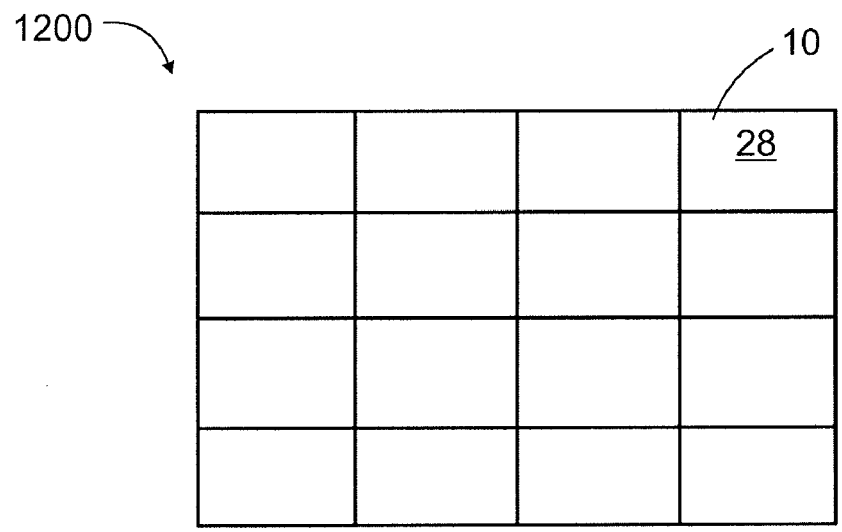
FIG. 12a is a plan view of an illumination panel incorporating multiple optical waveguide devices, according to some embodiments of the present invention.
Figure 12B:
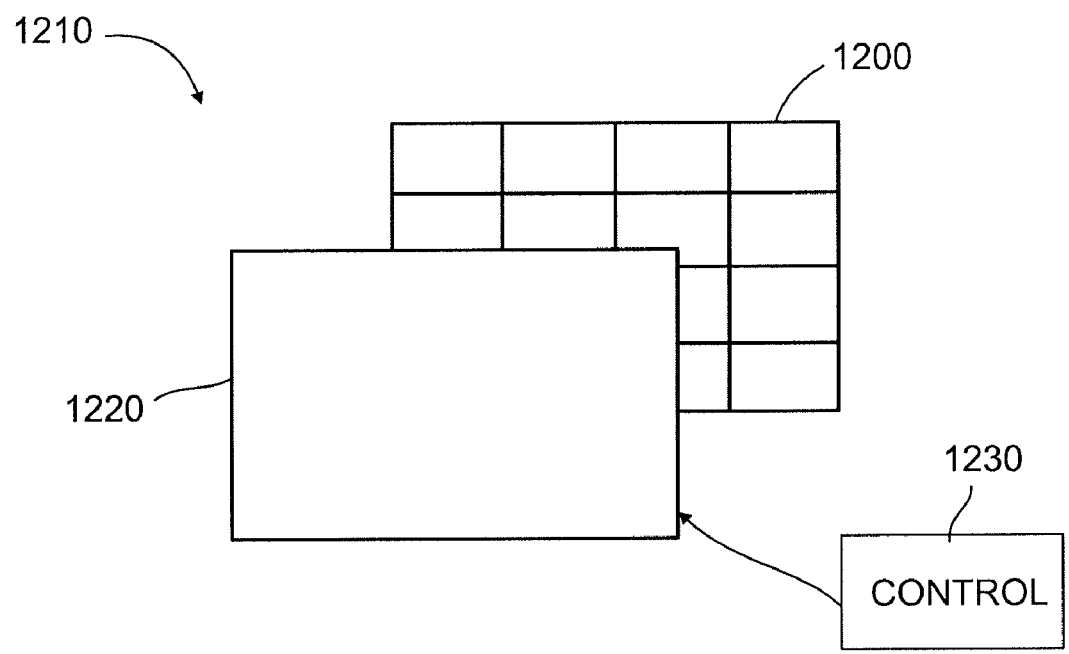

Referring to FIGS. 12a and 12b, in various embodiments of the invention, multiple optical waveguide devices 10 are utilized together to provide enhanced functionality. Illumination panel 1200 includes or consists essentially of a plurality of optical waveguide devices 10 attached together at their edges (or overlapped) in a "tiled" fashion. In order to provide substantially uniform illumination across the entire surface of illumination panel 1200, the waveguide devices 10 may be tiled together such that only out-coupling region 28 of each device 10 is visible. In-coupling region 30 and propagation region 26 of each device 10 may therefore be disposed beneath adjoining devices 10 and not visible. While illumination panel 1200 is illustrated as substantially planar, the flexibility of each waveguide device 10 enables illumination panel 1200 to be configured in a variety of shapes, including curved sheets and even spheres.

Illumination panel 1200 may be utilized to provide substantially uniform illumination in a variety of applications. For example, illumination panel 1200 may itself be utilized as a luminaire for lighting applications. In another embodiment, illumination panel 1200 is utilized as a backlight unit for a display device 1210, e.g., a liquid crystal display (LCD). Display device 1210 may additionally include an LCD panel 1220 defining a plurality of pixels, and may be actuated by signals received from control circuitry 1230.

Figure 13:
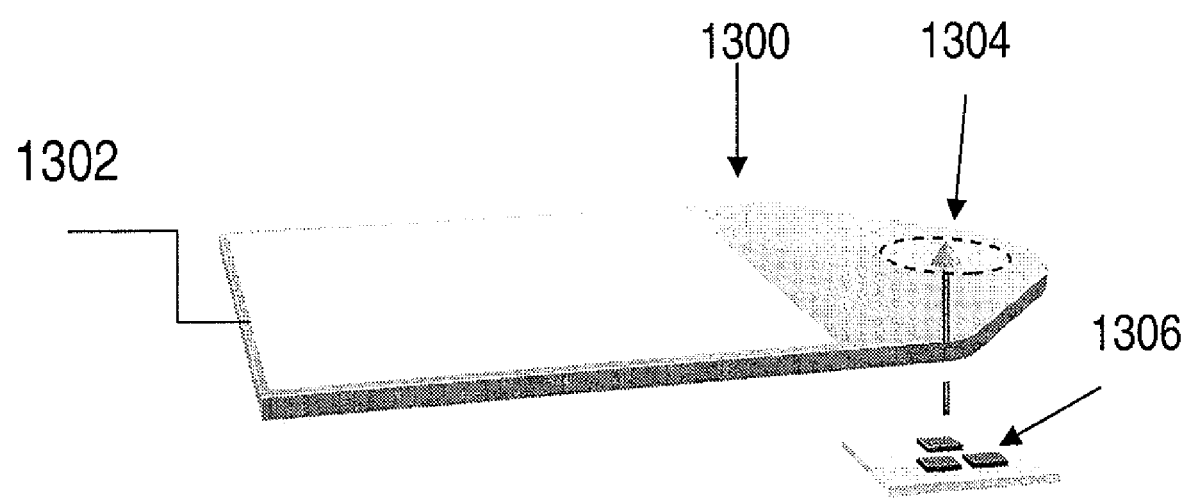
FIG. 13 is a schematic illustration of a light-emitting element that includes a phosphor layer.

Referring to FIG. 13, a phosphor layer 1302 may be added to a light-emitting element 1300. The phosphor layer 1302 converts light emitted from the in-coupling region 1304 from the light source 1306, such as an LED, into a different color (i.e., changes the spectrum). For example, part of the light from a blue LED may be converted to yellow light, which mixes with the remaining blue light to provide white output illumination. In other embodiments, phosphor material is placed at any location in the optical path, including locations without any direct line of sight from any light source.

The waveguide materials from which the waveguide device 10 is made may include or consist essentially of one or more polymeric materials. The polymeric material may optionally include a rubbery or rubber-like material. The material may be formed by dip-molding in a dipping medium, for example, a hydrocarbon solvent in which a rubbery material is dissolved or dispersed. The polymeric material optionally and preferably has a predetermined level of cross-linking, which is preferably between particular limits. The cross-linking may optionally be physical cross-linking, chemical cross-linking, or a combination thereof. A non-limiting illustrative example of a chemically cross-linked polymer is cross-linked polyisoprene rubber. Non-limiting illustrative examples of physically cross-linked polymers include cross-linked block co-polymers and segmented co-polymers, which may be cross-linked due to, e.g., micro-phase separation. The material is optionally cross-linked through application of radiation, such as, but not limited to, electron beam radiation and/or electromagnetic (e.g., ultraviolet) radiation.

Although not limited to rubber itself, the material optionally and preferably has the physical characteristics (e.g., parameters relating to tensile strength and elasticity) of rubber. For example, the waveguide material may be characterized by a tensile set value which is below 5%. The tensile set value generally depends on the degree of cross-linking and is a measure of the ability of a flexible material, after having been stretched either by inflation or by an externally applied force, to return to its original dimensions upon deflation or removal of the applied force.

The tensile set value may be determined by, for example, placing two reference marks on a strip of the waveguide material and noting the distance between them, stretching the strip to a certain degree, for example, by increasing its elongation to 90% of its expected ultimate elongation, holding the stretch for a certain period of time, e.g., one minute, then releasing the strip and allowing it to return to its relaxed length, and re-measuring the distance between the two reference marks. The tensile set value is then determined by comparing the measurements before and after the stretch, subtracting one from the other, and dividing the difference by the measurement taken before the stretch. In a preferred embodiment, using a stretch of 90% of an expected ultimate elongation and a holding time of one minute, the preferred tensile set value is less than 5%. Also contemplated are materials having about 30% plastic elongation and less than 5% elastic elongation.

Other exemplary materials, which may optionally be used alone or in combination with each other, or with one or more of the above rubber materials, include but are not limited to, crosslinked polymers such as: polyolefins, including but not limited to, polyisoprene, polybutadiene, ethylene-propylene copolymers, chlorinated olefins such as polychloroprene (neoprene) block copolymers, including diblock-, triblock-, multiblock- or star-block-, such as: styrene-butadiene-styrene copolymers, or styrene-isoprene-styrene copolymers (preferably with styrene content from about 1% to about 37%), segmented copolymers such as polyurethanes, polyether-urethanes, segmented polyether copolymers, silicone polymers, including copolymers, and fluorinated polymers and copolymers. In some embodiments of the present invention, the waveguide material may include or consist essentially of IOTEK.

The embedded particles may be glass beads, $BaSO_4$ particles, and/or similar particles. The volume density of the particles may be from about 0.1% to about 5%.

The number of extruders used to fabricate the core layer 16 may number from three to approximately 10. When the cladding layers 12, 14 are formed simultaneously with the core layer 16 the number of extruders may number from three to approximately 15. The total width of the coextrusion die may be about 400 mm to about 1200 mm, and it may be constructed and designed to provide from about 20 to about 100 side-by-side core structures 18.

The thickness of the cladding layers 12, 14 may be about 10 μm to about 100 μm. The thickness of the core layer 16 may be about 400 μm to about 1300 μm. The number of core structures 18 in the core layer may be approximately 20 structures to approximately 100 structures. The width of a single core structure 18 may be about 5 mm to about 30 mm.

Examples

The core structures 18 of an optical waveguide device 10 were fabricated from polyurethane. Two outer in-coupling zones 30 were each approximately 22 mm wide and included 0.5% volume density of VELVOLUX M synthetic $BaSO_4$ particles (available from Sachtleben Chemie GmbH of Duisburg, Germany) having approximate diameters of 5 μm. Propagation zones 26 were each approximately 29 mm wide and were substantially particle-free. The center out-coupling zone 28 was approximately 77 mm wide, and was composed of three core structures 18. The outer core structures 18 were approximately 26 mm wide and included 0.35% volume density of VELVOLUX M synthetic $BaSO_4$ particles. The middle core structure 18 of out-coupling zone 28 was approximately 25 mm wide and contained 0.2% volume density of BLANC FIXE F synthetic $BaSO_4$ particles (also available from Sachtleben Chemie GmbH of Duisburg, Germany) having approximate diameters of 1 μm. Out-coupling region 28 exhibited a nine-point average brightness of approximately 9078 Nits, with a uniformity of approximately 10%.

Another optical waveguide device 10 was fabricated from IOTEK, and included a propagation zone 26 that was substantially particle-free and had a width of approximately 11 mm. Out-coupling zone 28 was composed of three core structures 18. In increasing distance from propagation zone 26, these core structures 18 were 1) a 17 mm-wide region having 0.75% volume density of 5 μm-diameter $BaSO_4$ particles, 2) a 10 mm-wide region having 1.5% volume density of 5 μm-diameter $BaSO_4$ particles, and 3) a 10 mm-wider region having 3% volume density of 5 μm-diameter $BaSO_4$ particles. Illumination from this out-coupling zone 28 was approximately uniform across its width.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

What is claimed is:

1. An illumination structure comprising:
    a substantially non-fiber waveguide, the waveguide comprising:
        a discrete in-coupling region for receiving light and comprising an optical element disposed therewithin,
        a discrete propagation region for propagating light and that is substantially free of the optical element, and
        a discrete out-coupling region for emitting light, the in-coupling, propagation, and out-coupling regions being spatially distinct, light entering the in-coupling region being substantially retained within the waveguide for emission from the out-coupling region.

2. The illumination structure of claim 1, further comprising:
    a first cladding layer disposed over a top surface of the waveguide; and
    a second cladding layer disposed beneath a bottom surface of the waveguide.

3. The illumination structure of claim 1, wherein the optical element comprises a plurality of scattering particles.

4. The illumination structure of claim 1, wherein the propagation region is substantially free of scattering particles.

5. The illumination structure of claim 1, wherein the out-coupling region comprises a plurality of scattering particles.

6. The illumination structure of claim 5, wherein the scattering particles have a concentration that varies across at least one dimension of the out-coupling region.

7. The illumination structure of claim 6, wherein the concentration of scattering particles increases with distance from the in-coupling region.

8. The illumination structure of claim 1, wherein the out-coupling region comprises a plurality of core structures, at least some of which comprise a plurality of scattering particles, and wherein at least one of a size, a concentration, or a type of the scattering particles varies among at least two of the core structures.

9. The illumination structure of claim 8, wherein, in a direction perpendicular to a general direction of light propagation therethrough, there is substantially no overlap between individual core structures.

10. The illumination structure of claim 8, wherein each of the core structures has a substantially quadrilateral cross-sectional area.

11. The illumination structure of claim 10, wherein the cross-sectional area is substantially rectangular.

12. The illumination structure of claim 1, further comprising means for emitting light disposed proximate the in-coupling region.

13. The illumination structure of claim 1, further comprising means for emitting light disposed within the waveguide.

14. The illumination structure of claim 1, further comprising a reflector disposed proximate a surface of the in-coupling region.

15. The illumination structure of claim 1, wherein the waveguide is substantially planar.

16. The illumination structure of claim 1, wherein an optical mean free path of light in the propagation region is substantially constant, and an optical mean free path of light in the out-coupling region varies substantially monotonically.

17. A method of producing light, the method comprising:
providing a substantially non-fiber waveguide comprising:
a discrete in-coupling region for receiving light comprising an optical element disposed therewithin,
a discrete propagation region for propagating light and that is substantially free of the optical element, and
a discrete out-coupling region for emitting light; and
emitting light proximate the in-coupling region, whereby the light propagates through the propagation region with substantially no emission therefrom into the out-coupling region, and is emitted from the out-coupling region.

18. The illumination structure of claim 1, wherein the optical element comprises a microlens.

19. The illumination structure of claim 1, wherein the optical element comprises an optical funnel.

20. The illumination structure of claim 1, wherein the in-coupling region receives light entering in a first direction, the propagation region propagates light in a second direction perpendicular to the first direction, and the out-coupling region emits light in a third direction perpendicular to the second direction.

21. The illumination structure of claim 13, wherein the means for emitting light consists essentially of a bare-die light-emitting diode.

22. The method of claim 17, wherein the optical element comprises a plurality of scattering particles.

23. The method of claim 17, wherein the optical element comprises a microlens.

24. The method of claim 17, wherein the optical element comprises an optical funnel.

25. The method of claim 17, wherein the in-coupling region receives light entering in a first direction, the propagation region propagates light in a second direction perpendicular to the first direction, and the out-coupling region emits light in a third direction perpendicular to the second direction.

* * * * *

UNITED STATES PATENT AND TRADEMARK OFFICE
CERTIFICATE OF CORRECTION

PATENT NO. : 7,929,816 B2  
APPLICATION NO. : 12/324535  
DATED : April 19, 2011  
INVENTOR(S) : Noam Meir et al.

Page 1 of 1

It is certified that error appears in the above-identified patent and that said Letters Patent is hereby corrected as shown below:

On the Title Page,

Item 60, "Related U.S. Application Data," should read

--Provisional application No. 61/006,110, filed on Dec. 19, 2007,
 provisional application No. 61/064,384, filed on Mar. 3, 2008,
 provisional application No. 61/127,095, filed on May 9, 2008,
 provisional application No. 61/076,427, filed on Jun. 27, 2008,
 provisional application No. 61/135,098, filed on Jul. 16, 2008.--

Signed and Sealed this
Twenty-first Day of June, 2011

David J. Kappos
*Director of the United States Patent and Trademark Office*